Figure 1:
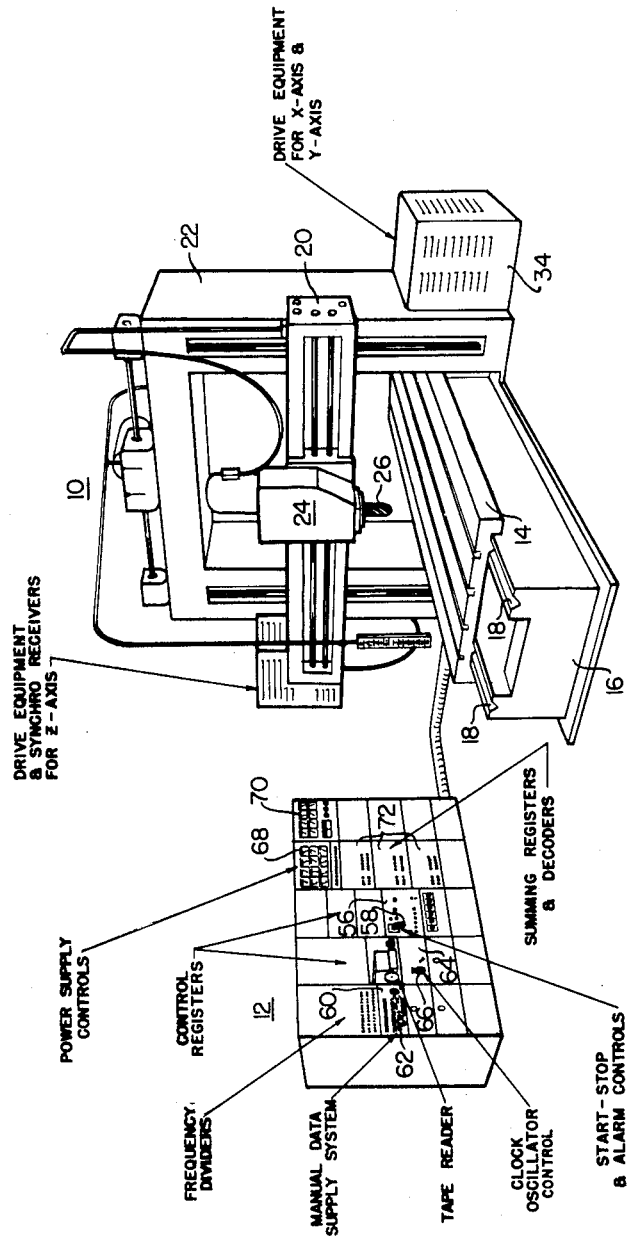

Dec. 18, 1962  J. W. FORRESTER ET AL  3,069,608
NUMERICAL CONTROL SERVO-SYSTEM
Filed Aug. 14, 1952  15 Sheets-Sheet 1

*INVENTORS*
JAY W. FORRESTER
WILLIAM M. PEASE
JAMES O. McDONOUGH
ALFRED K. SUSSKIND

BY Burton & Parker Attys

Dec. 18, 1962 J. W. FORRESTER ET AL 3,069,608
NUMERICAL CONTROL SERVO-SYSTEM
Filed Aug. 14, 1952 15 Sheets-Sheet 4

*INVENTORS*
JAY W. FORRESTER
WILLIAM M. PEASE
JAMES O. McDONOUGH
ALFRED K. SUSSKIND

BY Burton & Parker Attys

Dec. 18, 1962   J. W. FORRESTER ET AL   3,069,608
NUMERICAL CONTROL SERVO-SYSTEM
Filed Aug. 14, 1952   15 Sheets-Sheet 8

INVENTORS
JAY W. FORRESTER
WILLIAM M. PEASE
JAMES O. McDONOUGH
ALFRED K. SUSSKIND

Dec. 18, 1962  J. W. FORRESTER ET AL  3,069,608
NUMERICAL CONTROL SERVO-SYSTEM
Filed Aug. 14, 1952  15 Sheets-Sheet 10
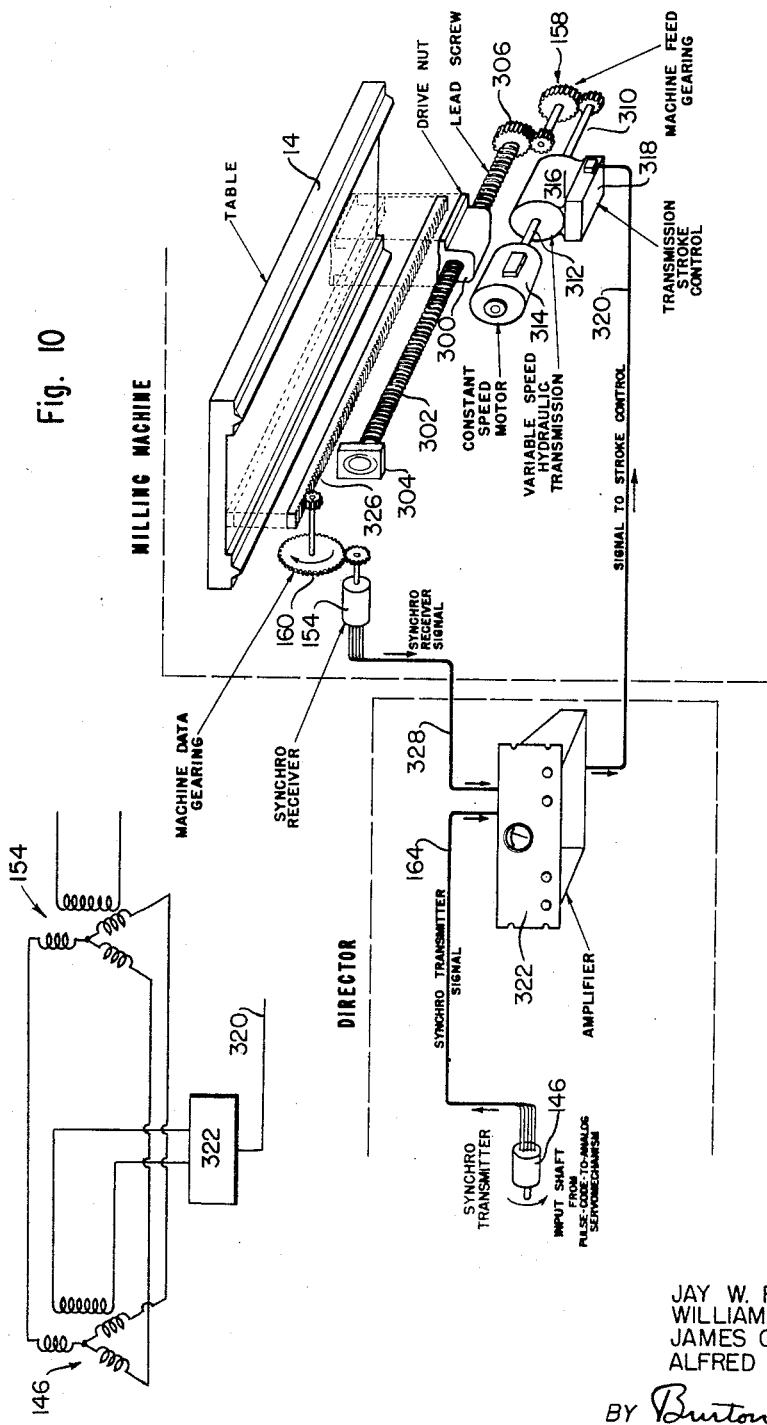
INVENTORS
JAY W. FORRESTER
WILLIAM M. PEASE
JAMES O. McDONOUGH
ALFRED K. SUSSKIND
BY Burton & Parker Attys.

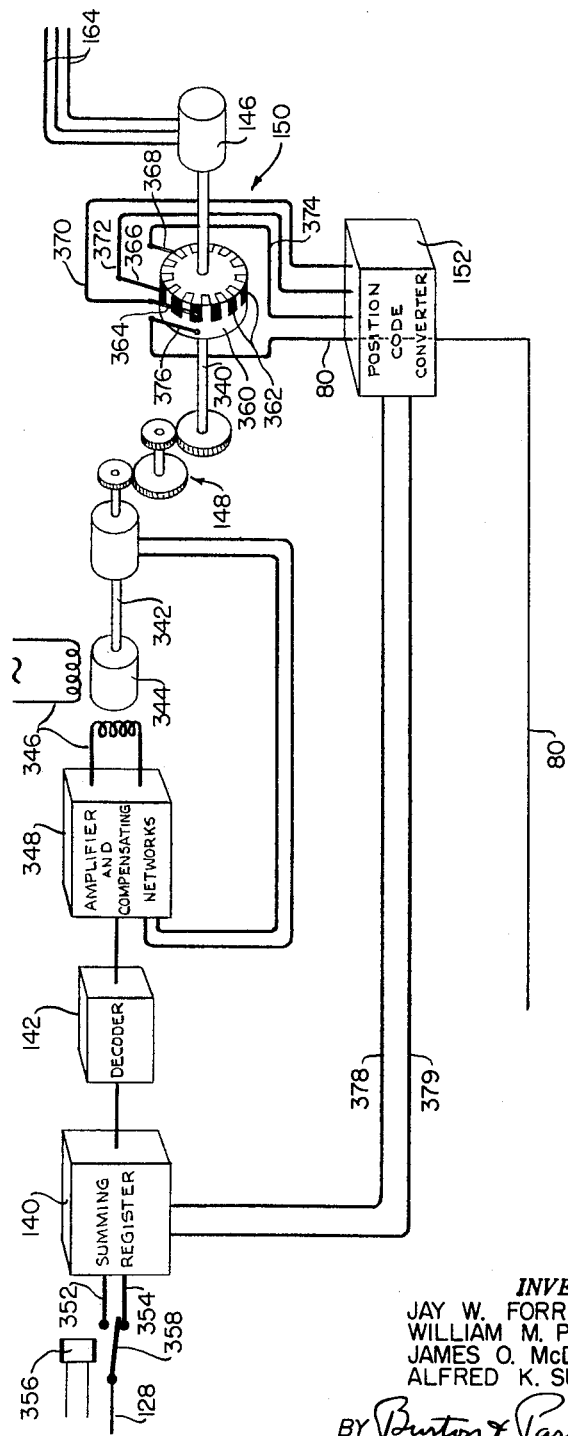

Dec. 18, 1962     J. W. FORRESTER ET AL     3,069,608
NUMERICAL CONTROL SERVO-SYSTEM
Filed Aug. 14, 1952     15 Sheets-Sheet 12

*INVENTORS*
JAY W. FORRESTER
WILLIAM M. PEASE
JAMES O. McDONOUGH
ALFRED K. SUSSKIND

BY *Burton & Parker* Attys.

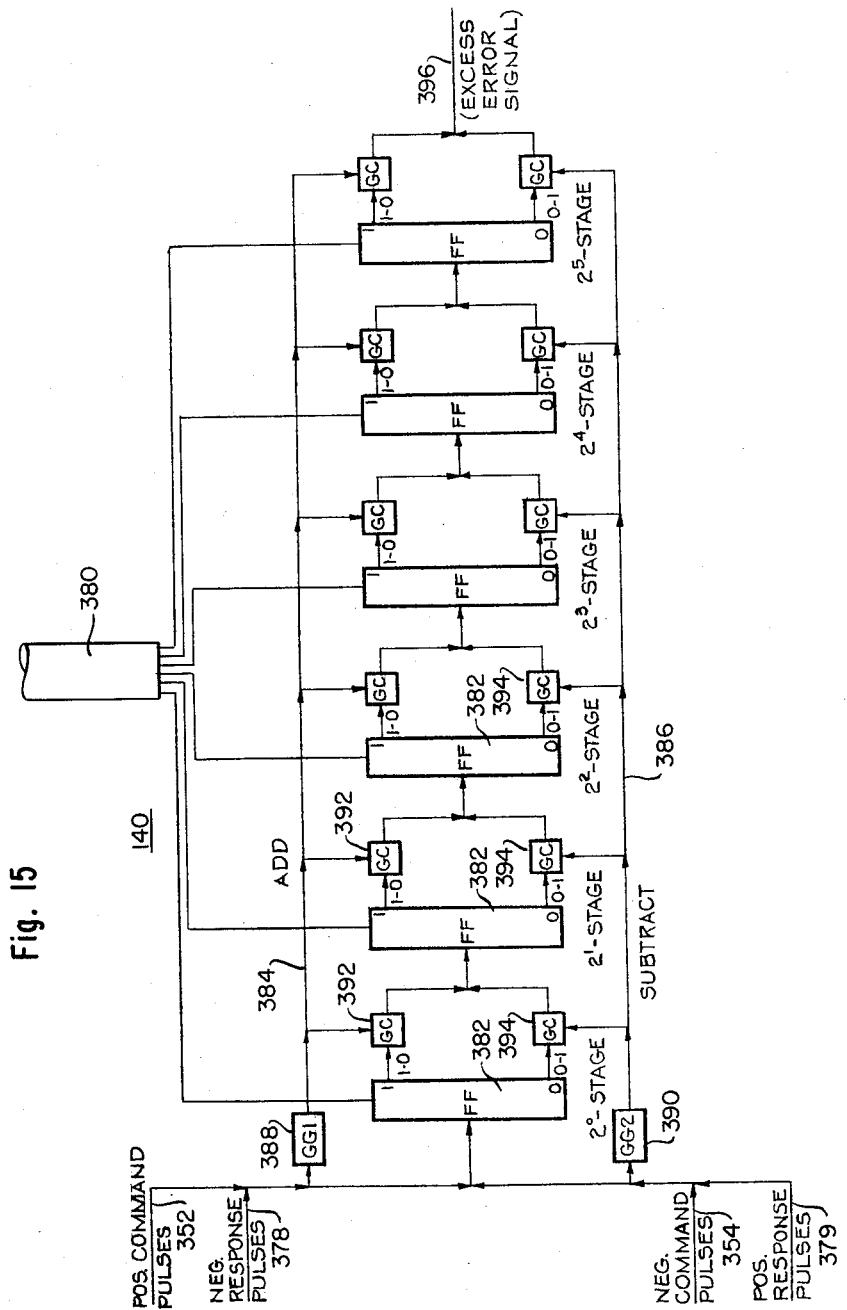

Dec. 18, 1962   J. W. FORRESTER ET AL   3,069,608
NUMERICAL CONTROL SERVO-SYSTEM
Filed Aug. 14, 1952   15 Sheets-Sheet 15
Fig. 17
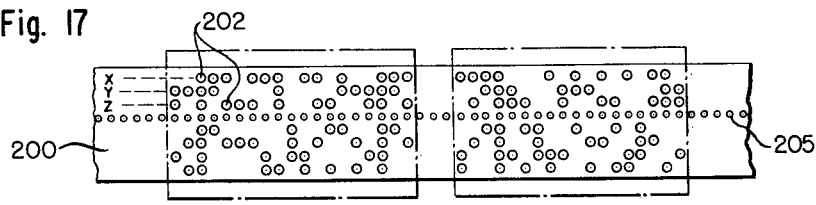
Fig. 18
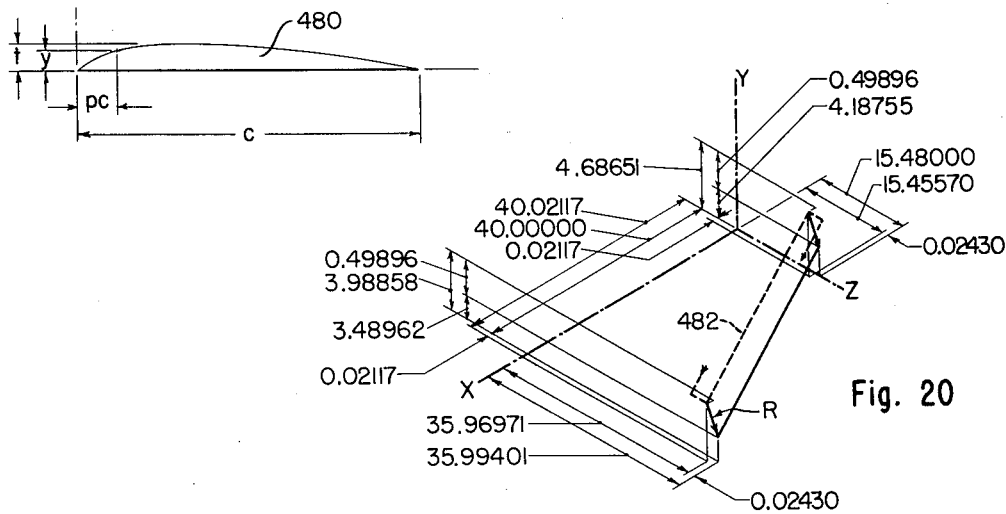
Fig. 20
Fig. 19
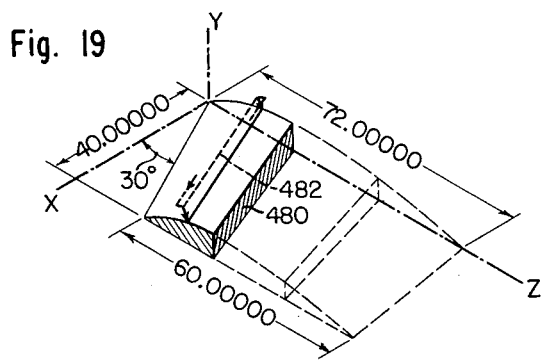
*INVENTORS*
JAY W. FORRESTER
WILLIAM M. PEASE
JAMES O. McDONOUGH
ALFRED K. SUSSKIND
BY Burton & Parker Attys

United States Patent Office 3,069,608
Patented Dec. 18, 1962

3,069,608
NUMERICAL CONTROL SERVO-SYSTEM
Jay W. Forrester, William M. Pease, and James O. McDonough, Concord, and Alfred K. Susskind, Cambridge, Mass., assignors, by mesne assignments, to John T. Parsons, Danville, Ill.
Filed Aug. 14, 1952, Ser. No. 304,294
69 Claims. (Cl. 318—162)

This invention relates to control systems and particularly to a novel method of and apparatus for controlling the operation of industrial appliances and processes such as machine tools and the like.

The general purpose of this invention is to provide an improved control system which is especially desirable for machining mathematically definable surfaces without resorting to the expensive practice of first constructing models or templates having better than the required accuracy of the finished work. In such use, the present invention enables the machining or shaping of work which is not limited to lines parallel to the machine-feed directions but permits any cutting or shaping operation along any line skewed or inclined with respect to the machine-feed directions. No models or templates are required to perform the coordinated motions in the machine-feed directions and instead, information for controlling the machine may be stored in coded form on simple, convenient mediums such as punched paper tape, punched cards, magnetic tape, photographic film, et cetera. Electrical means is employed for interpreting the coded information and for transmitting the information in electrical form to the one or more moving operating parts of the controlled unit or machine. The result is that the control system or director may be located remote from the machine and be used not only to control one but several similar machines.

Although the invention is applicable to the control of the movement and positioning of one or more moving parts of various types of apparatus, it is especially applicable to the shaping or sculpturing of objects and particularly the machining of templates, forging dies, stretch form dies, airfoil sections, et cetera. Conventional die making and similar shaping processes are usually laborious, time consuming, painstaking operations requiring the production of checking templates, and final hand finishing to produce an accurate die. The present invention eliminates the production of template and in most instances reduces the necessity for hand finishing of the die or other object worked on at the same time permitting smaller tolerances than those usually required by present day standards. The elimination of the tedious hand operations as well as the production of templates, considerably shorten the diemaking time.

An important object of the invention is to provide a control system for a machine, such as a milling machine, which incorporates a pulsed sensing electrical circuit and provides binary-divided pulse rates properly phased to interpret the commands on medium containing the stored control information. The control system is designed to employ digital technique to maximum advantage and requires only a single enumerating specification. An important feature of the invention is the integration of the rate and position commands into one system enabling the use of a single medium upon which the stored information is carried.

Another important object of the invention is to provide a control system which insures synchronism between the various motions of the machine and which converts the information provided in digital form into the analog form finally embodied in the machined workpiece. An important feature of the invention is the use of a common time parameter in the digital domain for coordinating all motions included in the control system. Another important feature of the invention is the provision for selecting a choice of ratios available in the digital domain which are readily changeable to various speeds.

Another important object of the invention is the elimination of the necessity of separate orders or commands for the rate of advance of one or more machine operated parts and for governing the position thereof. The invention provides a single set of binary-divided pulse rates which generate "machine time" and "machine space," both having the same dimensions expressed in pulses thereby eliminating the necessity of providing separate orders or commands for the rate and the position of the operating parts controlled thereby.

Another important object of the invention is to provide a novel method of and means for synchronizing command pulses governing the action of one or more controlled parts or servo-mechanisms with response pulses for substantially simultaneously synchronizing the input commands with the output responses in order that the system may behave as nearly like a continuously operated system as possible.

Another important object of the invention is to provide improved means in the system for storing and comparing the input commands and output responses in incremental form and for simultaneously subtracting one from the other to obtain a differential or error signal for controlling the movement of one or more servomotors. In carrying out this object there is provided a reversible counter which approximates a continuous differential for an error detecting or summing device and which enables the output to be compared with the input substantially simultaneously and while storing only the maximum error and not the entire command number.

Another important object of the invention is to provide a master or clock oscillator which generates a series of pulses spaced in time, each pulse of which may represent an instruction to an operating part of the machine to move one unit of distance. An important feature of the invention relates to the provision of a frequency divider associated with the clock oscillator which generates a pattern of potential command pulses for governing the operation of the servo-mechanisms. Another important feature of the invention is the novel association of the frequency divider with an information storage medium responsive to coded information on tape or otherwise which impresses the stored information into the potential command pulses provided by the frequency divider.

Another important object of the invention is to provide a counting-error detector which functions to subtract the output from the input pulses and is reversible to approximate a continuous error-detecting or summing device. The counting error detector has a register capacity which by virtue of its construction and function need only be large enough to store the maximum differential or error between the input and output pulses, which differential or error is utilized to control the operation of one or more servomotors. In consequence, the digital conversion of the output and the input is in pulses and in a differential or error channel where the signals are relatively small. The digital conversion to the analog commands is "inside the loop" of one or more servo-mechanisms employed in the machine and as a result the analog uncertainty is limited to an arbitrarily small percentage of the total signal handled.

Another important object of the invention is to provide a code converter in the form of a sensing system operating on pulses and which permits the use of synchronizing sensing pulses for accuracy and checking.

Another important object of the invention is to provide a dual storage system which allows the machine to operate continuously from discontinuously obtained data furnished by coded media such as punched tape. The dual storage system comprises two storage registers which are alternately operable to impress the information stored therein into the potential command pulses for operating the servo-mechanisms.

Another important object of the invention is to provide means for checking the operation of the machine parts and particularly the use of a counter as an error detector which provides one pulse in a series of pulses for each cycle of information. This pulse is preferably the last of the series of pulses provided for each cycle of information and is used as a check on the system to avoid any unannounced loss of synchronism either in the control system or in the functioning of the servo-mechanisms.

Another important object of the invention is to provide a novel method and means for detecting or sensing the direction in which an operating part or tool of the machine has moved. This is accomplished by the provision of a novel position coder which transmits outgoing pulses in separate circuits, the sequence of such pulses being alterable depending upon the position of the operating part for controlling the direction of the future movement of the part. These signals, in the form of pulses, are carried within the loop of the servo-mechanisms and incorporated in the pulsing system at the point where the digital commands are converted into analog commands.

Various other objects, advantages and meritorious features of the invention will become more fully apparent from the following specification, appended claims and accompanying drawings wherein:

FIG. 1 is a general perspective view of a machine tool in the form of a bridge type planer mill and a director unit for controlling the operation of the machine tool.

Figure 2:
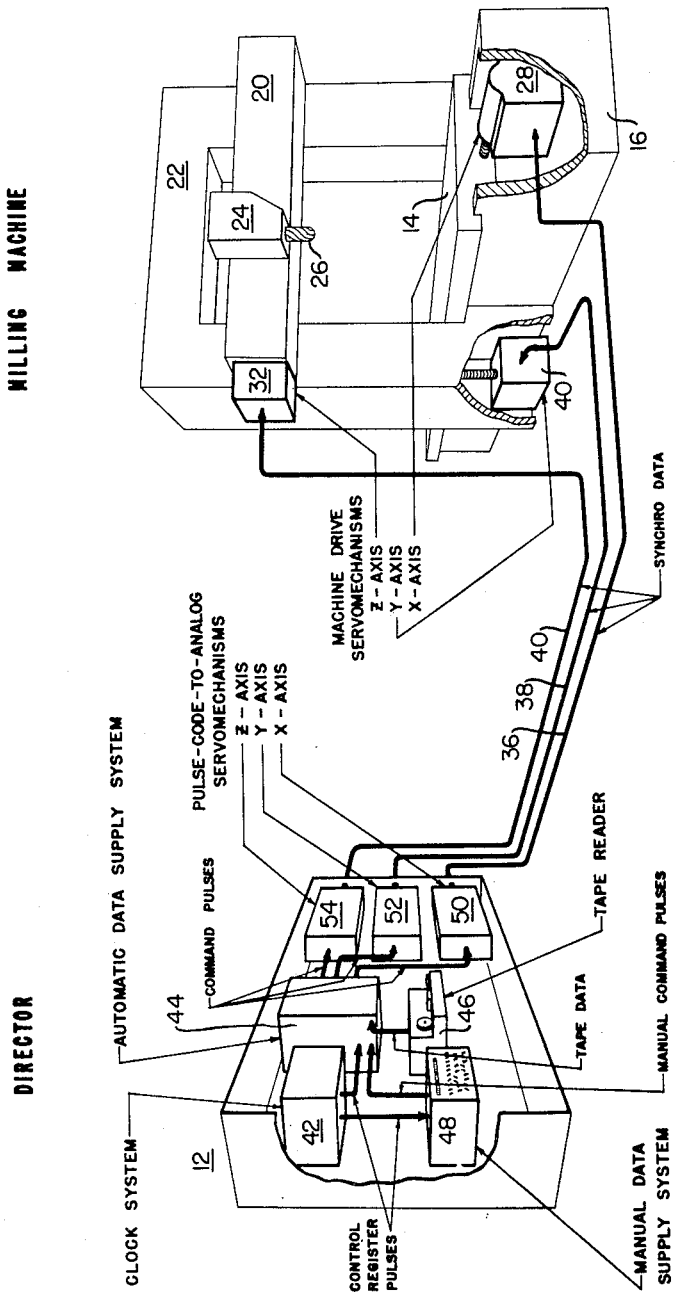
Figure 3:
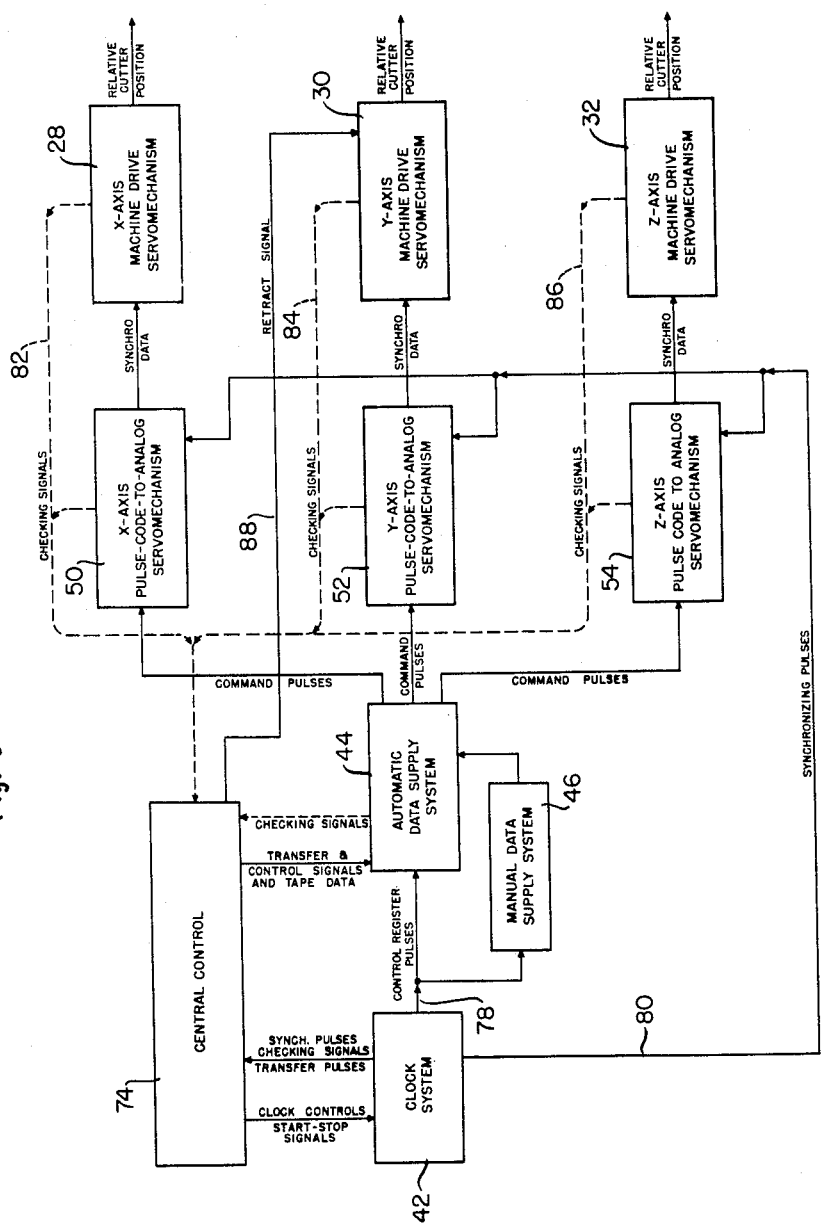
Figure 4:
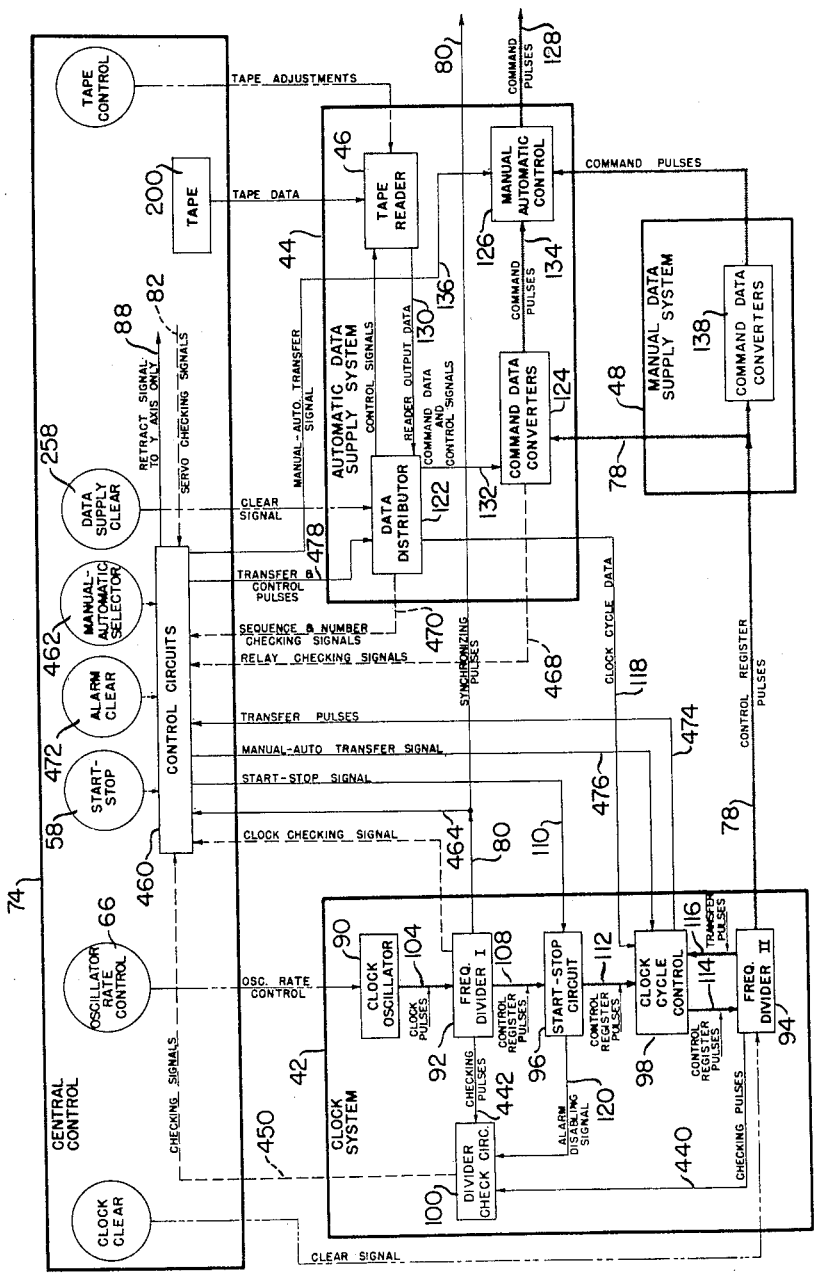
Figure 5:
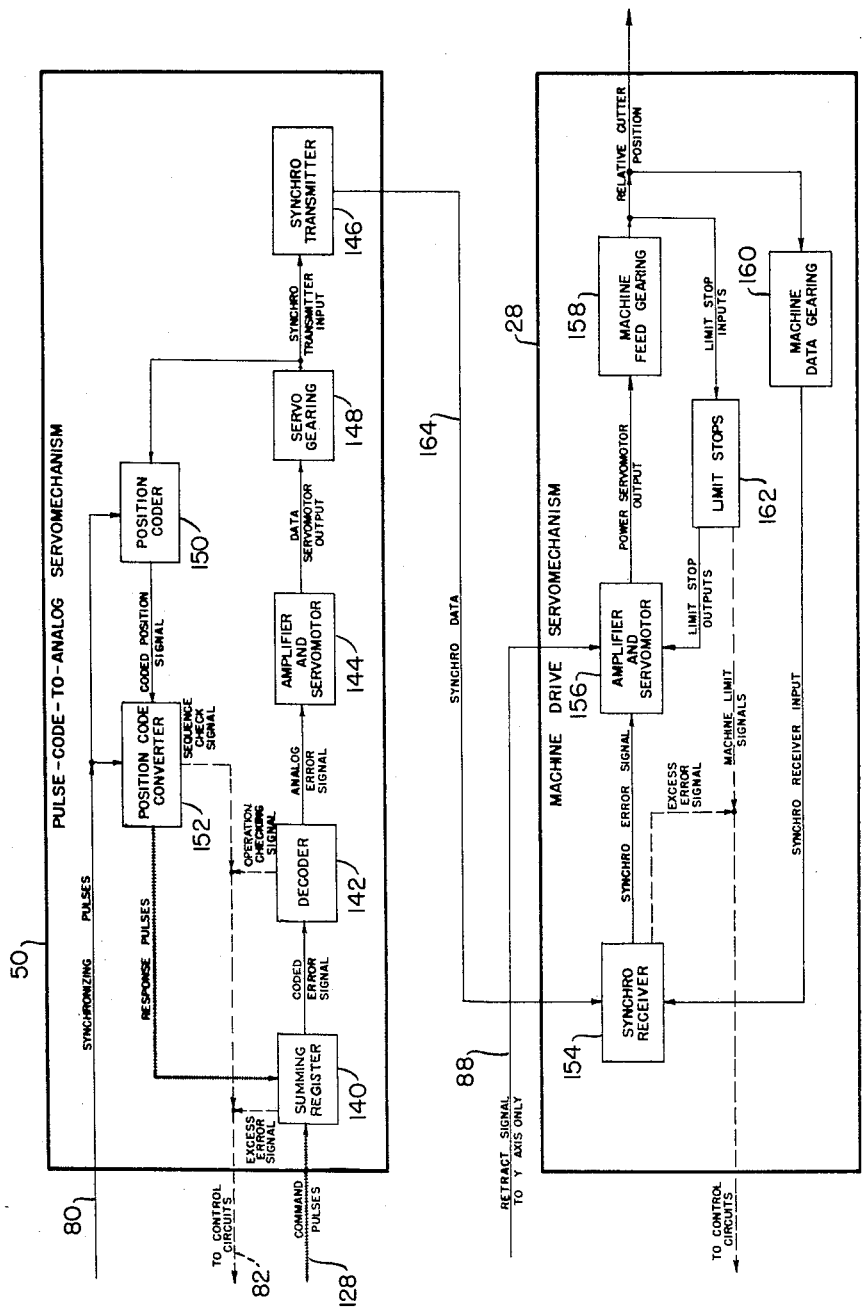
Figure 6:
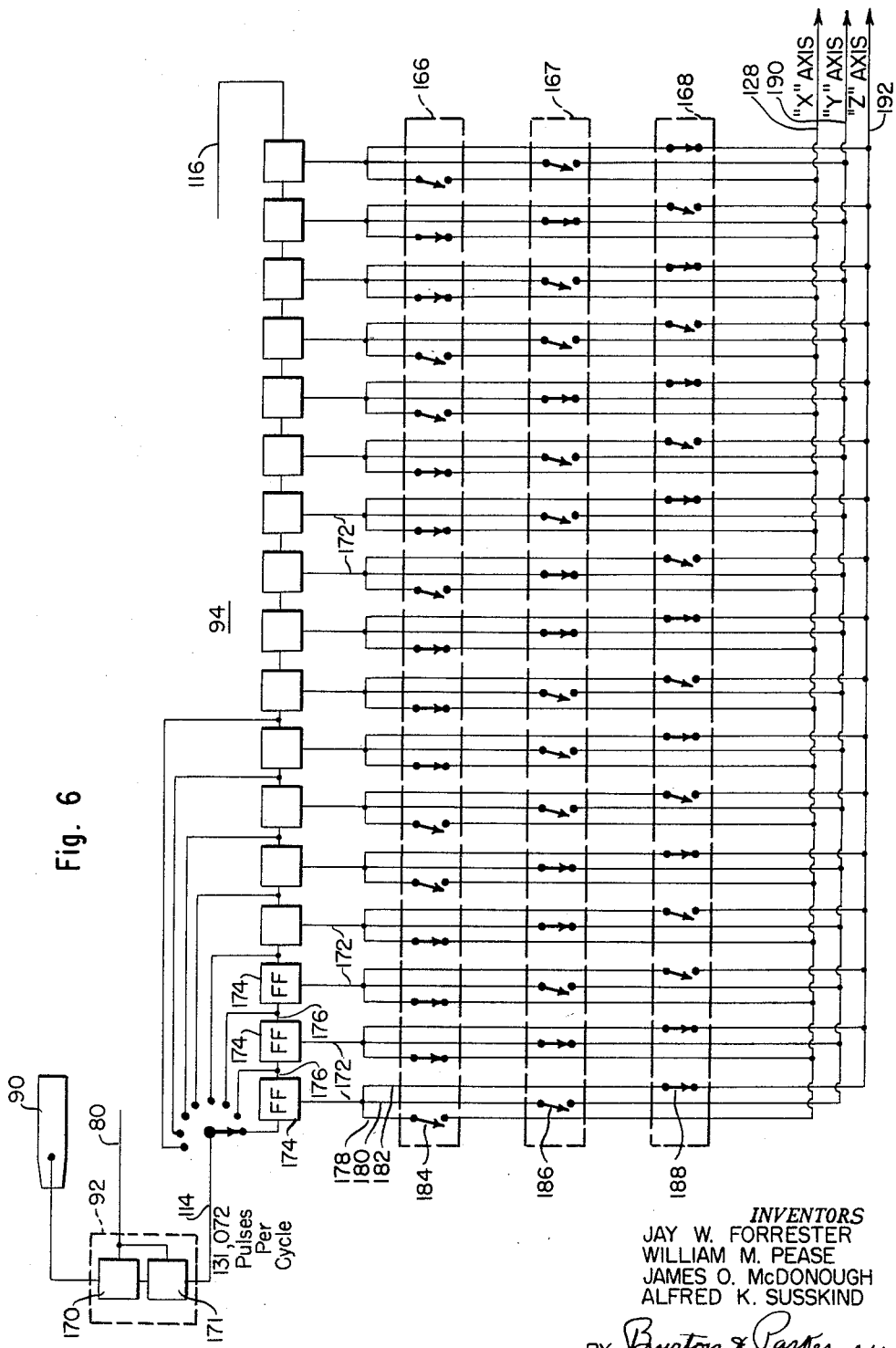
Figure 7:
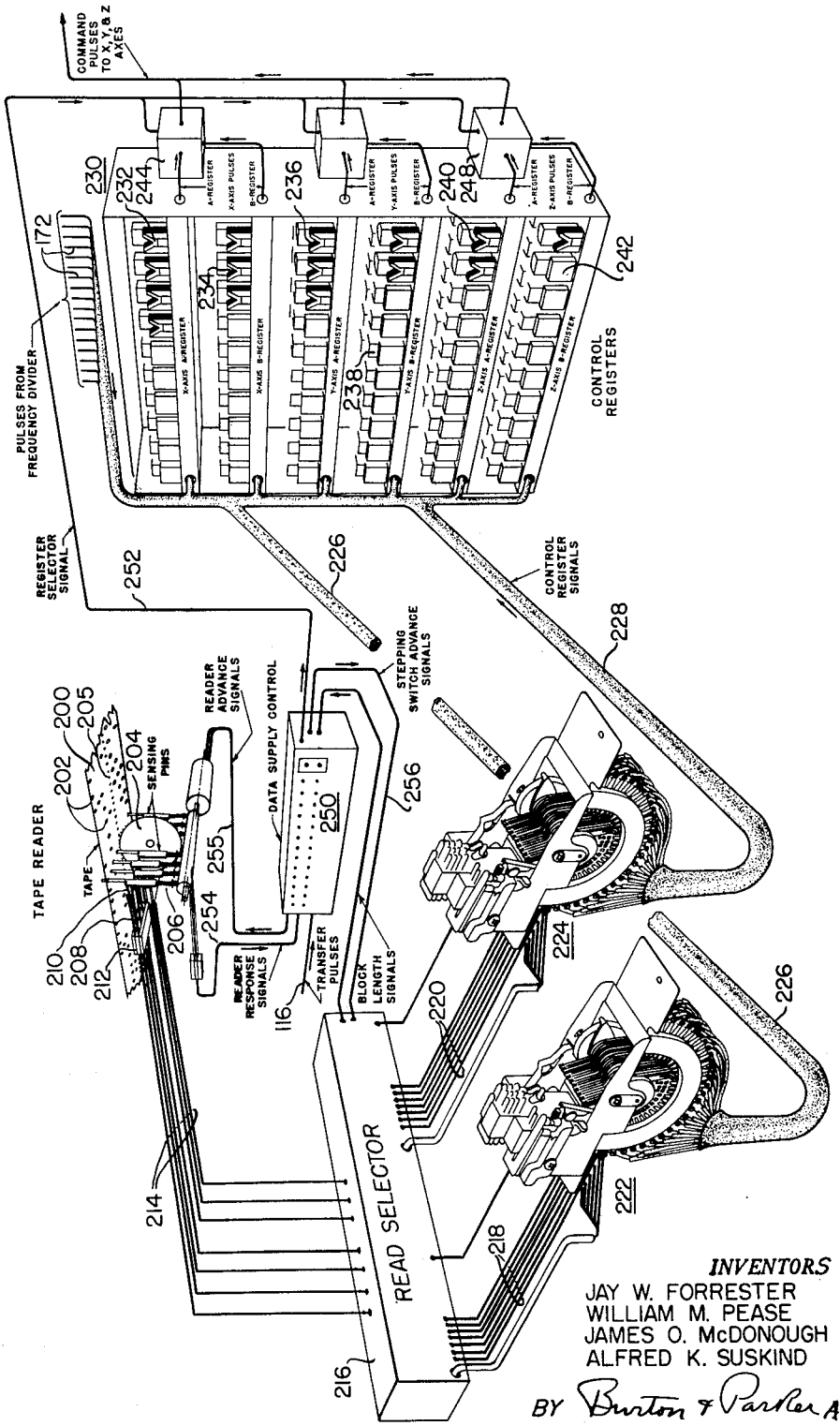
Figure 8:
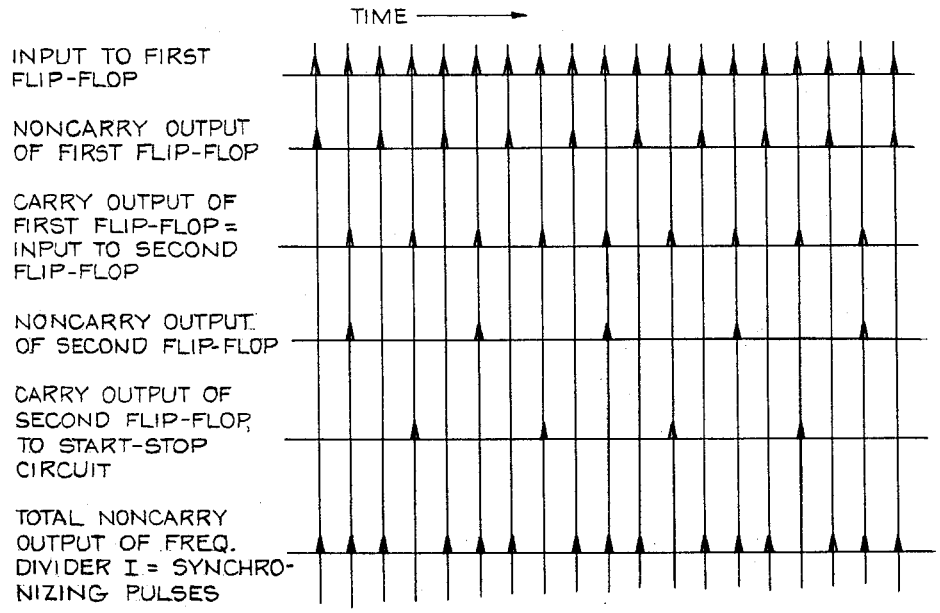
Figure 14:
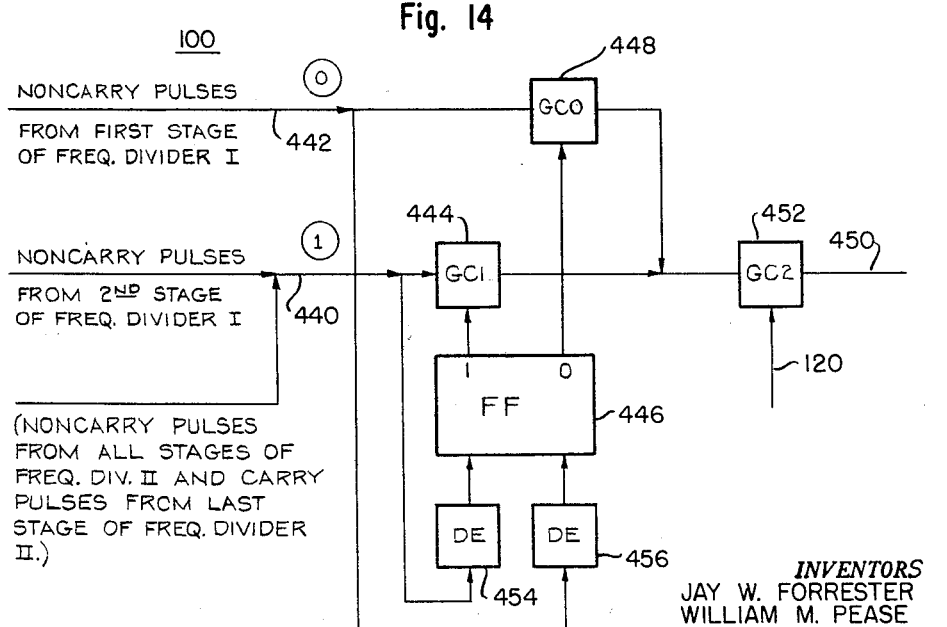
Figure 9:
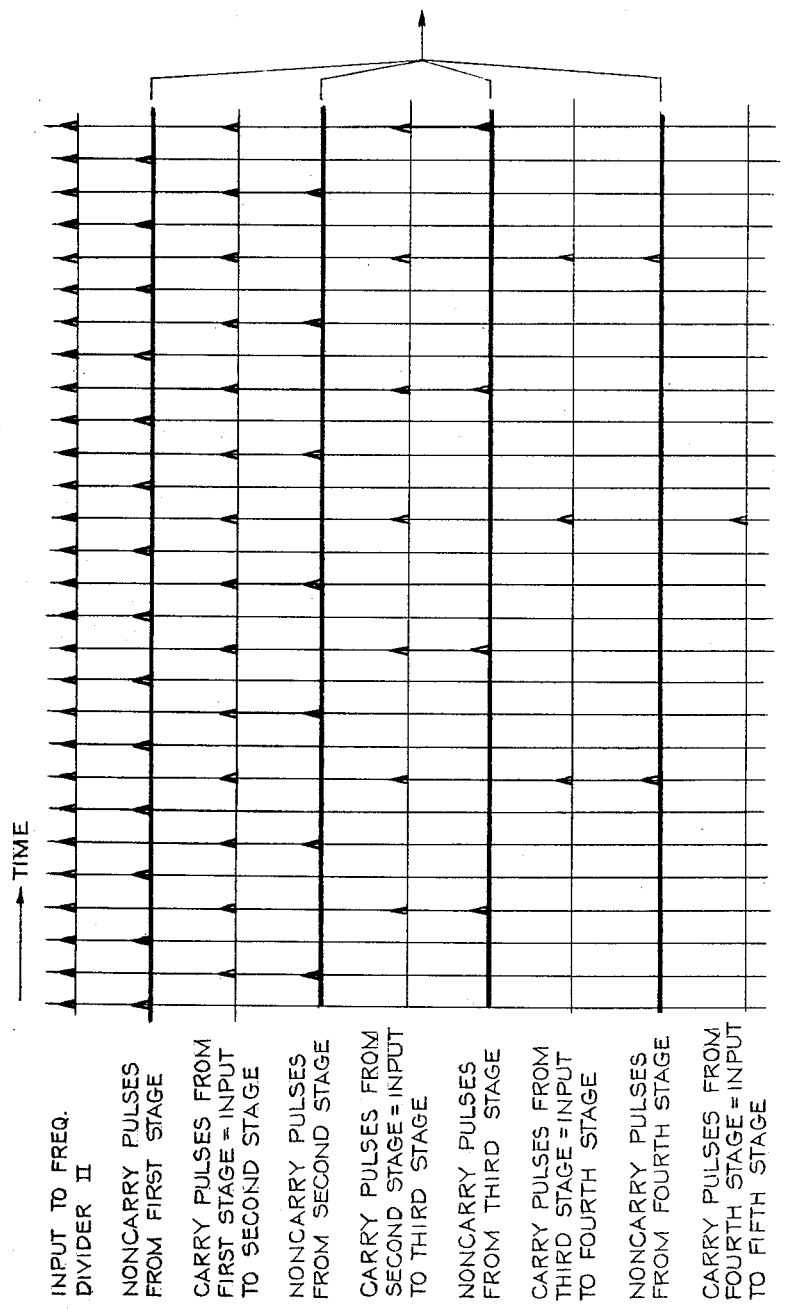
Figure 13:
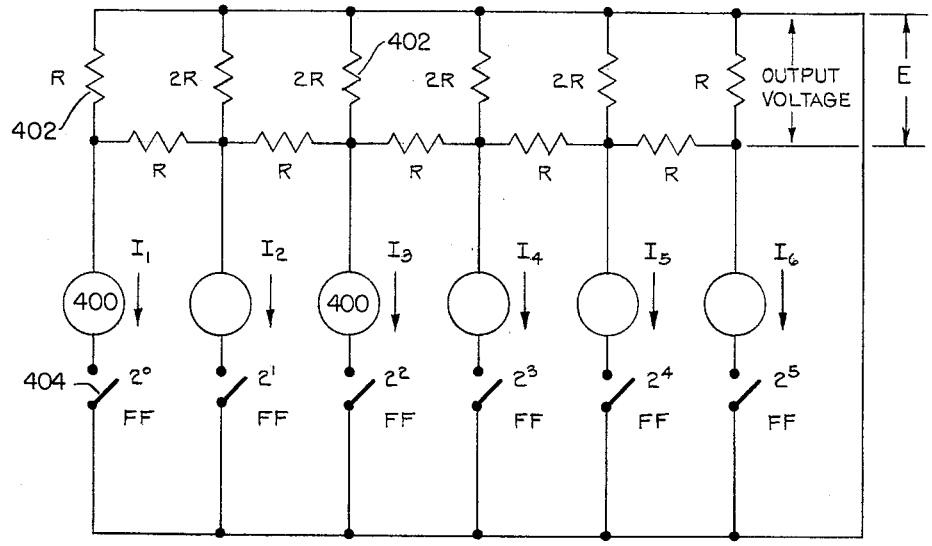
Figure 12:
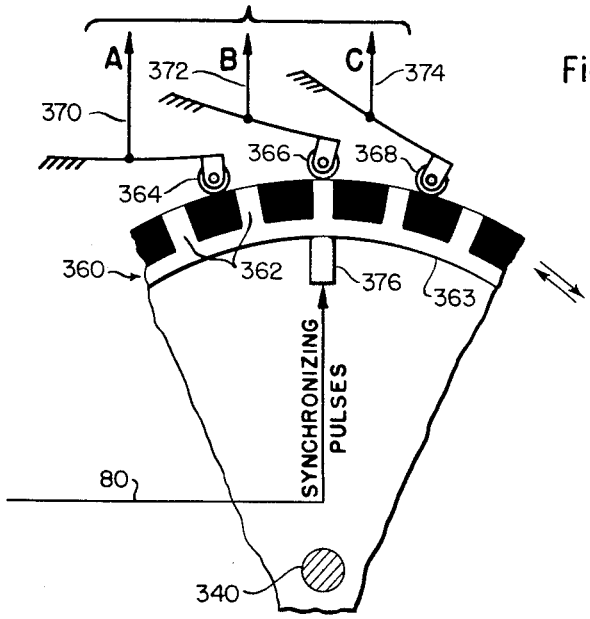
Figure 16:
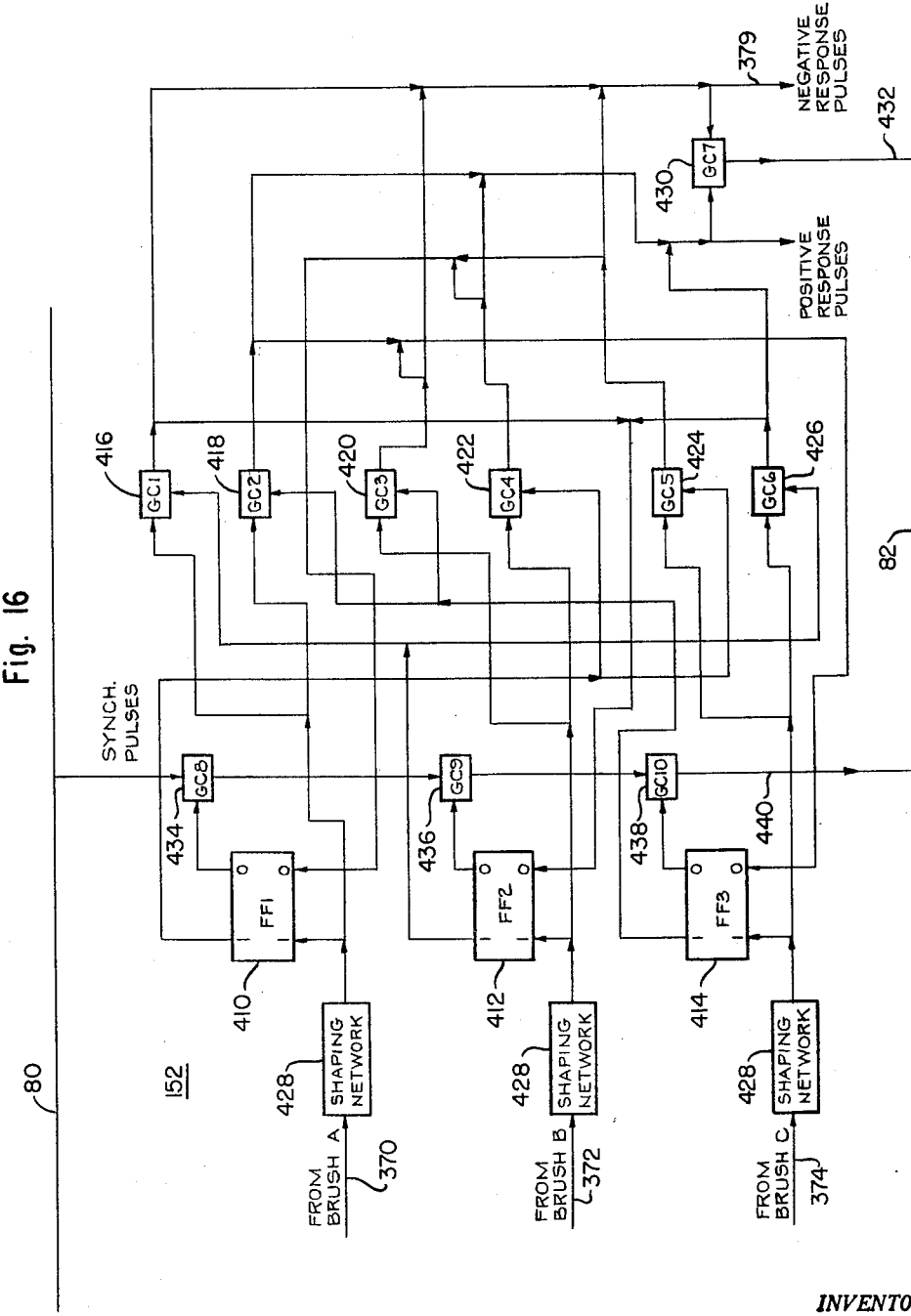

FIG. 2 is a functional block diagram in perspective of the machine tool and its director unit and partially broken away to show the major components thereof and the interconnection therebetween, FIG. 3 is a simplified block diagram of the overall system of the invention for controlling the operating parts of a machine tool, FIG. 4 is a partial block diagram of the control system of the present invention, FIG. 5 is the balance of the block diagram illustrated in FIG. 4, FIG. 6 is a simplified block diagram of the clock system schematically illustrating the division of a cycle of pulses generated by a clock oscillator and the modulation thereof by manual or automatic control means, FIG. 7 is a schematic view in perspective illustrating the automatic data supply system including the manner of reading coded information on punched tape and the distribution of such information to separate banks of storage control registers, FIG. 8 is a chart illustrating the pulse sequence provided by the initial frequency divider in the clock system, FIG. 9 is a chart illustrating the pulse sequence provided by the second frequency divider in the clock system, FIG. 10 is a schematic perspective view illustrating a typical power servo-mechanism for controlling the movement of one of the operating parts of a machine tool, FIG. 10A illustrates a preferred circuit for the synchro devices, FIG. 11 is a schematic perspective view of one of the pulse-code-to-analog servo-mechanisms in the control system, FIG. 12 is a diagrammatic representation of the position coder illustrating how pulses received by the coder are modified to determine the direction of each movement of the machine tool part controlled thereby, FIG. 13 is a simplified equivalent circuit of the decoder, FIG. 14 is a block diagram of the divider checking circuit, FIG. 15 is a block diagram of the summing register, FIG. 16 is a block diagram of the position-code converter, FIG. 17 is a plan view of a section of punched tape illustrating the arrangement of holes in two adjacent information blocks, FIG. 18 is a diagrammatic view of an airfoil panel, FIG. 19 is a perspective sectional view of the airfoil panel of FIG. 18, illustrating the relation of the cutter's center to the workpiece and the three axis coordinates, and FIG. 20 is a perspective diagram illustrating the correction to be applied to the coordinates to account for non-coincidence of cutter center to point of contact with the workpiece.

Although the control system of the present invention is applicable to other uses, it is herein described as applied to and combined with an industrial machine and specifically a machine tool. A machine tool numerically controlled by the system is designed to serve a function which is not available in existing types of such machines. It differs from standard machine tools in that directions of cuts are not limited in lines parallel to the machine-feed directions, but as a result of a positive coordination among the several feed mechanisms it is possible to cut along a line inclined or skewed with respect to the feed directions built into the machine. Moreover, such a machine tool differs from contour directed machine tools in that no models or templates are required to perform the coordinated motions in the several directions in which the machine is capable of operating.

The control instructions fed to the machine by the control system may be set in either manually or automatically by means of a control unit referred to as the director. The automatic instructions may be set into the machine on an information storing medium such as punched paper tape, magnetic tape, punched cards, photographic film, et cetera. These instructions are specifications of straight-line segments. By suitable coding of the data storing medium, such as punched tape, any curved line within the capabilities of the machine tool can be machined or cut by approximating the curved line by a series of straight-line segments. In addition, instructions to the machine may be set in manually at the director. This may be accomplished by means of a plurality of banks of switches which through circuits inform the machine how far it must travel in each coordinate direction and the machine acts upon these instructions to produce a straight-line motion for the specified interval.

FIG. 1 shows a conceptual arrangement of a machine tool and its director. The machine tool illustrated in FIG. 1 and subsequently discussed hereinafter is an example of how this invention may be applied. It is not limited to machines of this character. The illustrated machine tool is a bridge type of planer mill and is generally indicated at 10. The director for the machine tool is generally indicated at 12 and may be located near the machine tool or remote therefrom.

The particular machine tool illustrated herein has three operating axes functioning in planes perpendicular to one another in order to provide relative movement between the work and the shaping or cutting tool. These axes are referred to respectively as the "X," "Y" and "Z" axes. The "X" axis in the illustrated embodiment of the invention is utilized to drive a table 14 upon which the work is placed and to move the table relatively horizontally to and fro on a bed 16 having a pair of parallel ways or guide channels 18—18 of conventional design for this purpose. The "Y" axis is utilized to drive a part of the machine referred to as the rail 20 in a vertical path above the table 14. The rail is mounted for vertical travel on an inverted generally U-shaped column 22 which is a customary feature of the bridge type of planer mill. Carried on the rail 20 is a head 24 from which depends a shaping tool which may be a cutter 26. The third axis "Z" is utilized to drive the head 24 in a to and fro direction along the rail 20 cross-wise to the table 14.

Separate drive equipment is provided for moving the table 14, rail 20, and the head 24 as shown in FIG. 2, these drive mechanisms may be housed in separate units indicated respectively at 28, 30 and 32. However, as illustrated in FIG. 1, the drive equipment for the table and the rail may be housed in a single unit indicated at 34 at one side of the column 22. Each drive equipment for the separate axes of the machine tool is preferably a power operated servo-mechanism of the character hereinafter described.

The various component parts of the director 12 may be incorporated into a single unit as shown in FIGS. 1 and 2 and located either adjacent to the machine or remote therefrom. The director is electrically connected to the servo drive mechanisms of the machine tool by electric conduits as illustrated in FIG. 2. Separate electrical control channels lead from the director to each of these drive mechanisms, the one for the table drive equipment being indicated at 36; the one for the rail equipment being indicated at 38, and the one for the head drive equipment being indicated at 40. It is understood that the director 12 may be provided with simlar sets of control channels 36, 38 and 40 for controlling one or more additional machine tools.

The director 12 of the control system is sub-divided into a plurality of components which are electrically coupled together for decoding and furnishing command information to the power servo-mechanisms housed in the units 28, 30 and 32, for comparing the resulting operation of the moving part of the machine against the command information furnished thereto, and for checking the components and for indicating any malfunction in the control system. Referring to FIG. 2, the director 12 is broken away to show schematically such components as a clock system 42, an automatic data supply system 44 including a reader 46 for sensing stored information such as on punched tape, a manual data supply system 48, and as many pulse converting servo-mechanisms as there are machine drive axes on the machine such as the three units 50, 52 and 54, referred to as pulse-code-to-analog servo-mechanisms, which separately control the machine drive servomotor units 28, 30 and 32 respectively as illustrated by the communicating channels 36, 38 and 40 between the director and the milling machine.

The director unit 12 is provided with a front panel as shown in FIG. 1 upon which various control and indicating elements are preferably visibly mounted for actuation and observation by the operator. Such control and indicating elements are schematically shown in FIG. 1. The front panel of the director may be sub-divided into panel sections fronting the different components of the director therewithin. For example, one panel section 56 may contain a start and stop control member 58 and associated alarm controls mounted adjacent thereto. Another panel section, such as that indicated at 60, may contain means for manually feeding data into the system including a plurality of toggle switches 62 disposed on the panel section in accessible position. The means for automatically supplying data into the control system, such as the tape reader 46, may be mounted in the director with the front panel section removed in order to render it accessible to use. A front panel section 64 may be provided with a control member 66 for varying the frequency of a pulse generating clock oscillator. Other front panel sections of the director may be provided with power supply controls such as indicated at 68 and 70, and with indicating elements 72 associated with summing registers and decoders. All the component parts of the director may be housed in one or more units adjacent to the machine controlled thereby, or they may be separately located from one another and the machine.

FIG. 3 is a simplified block diagram of the control system for a machine tool showing the connections of the major functional elements thereof. For purpose of clarity, a brief reference to the simplified block diagram will show a panel 74 referred to as the central control which functions to start and stop the machine, check signals supplied by the directing elements of the system and as later pointed out hereinafter for indicating any malfunctioning of the machine to the operator. The central control is electrically connected to the clock system 42 previously mentioned which serves as the primary pulse source for the operation of the machine. Included in the clock system as hereinafter described is means for dividing the pulses emitted by the clock system. One set of divided pulses from the clock system is furnished by channel 78 to both the automatic data supply system 44 with which the tape reader 46 or other form of sensing mechanism for reading stored information is associated and to the manual data supply system 48 which, as shown in the block diagram of FIG. 3, is disposed in relatively parallel relationship to the automatic data supply system. Another divided set of pulses from the clock system 42 is conveyed by channel 80 for synchronizing the operation of the pulse-code-to-analog servo-mechanisms in the manner hereinafter described.

The function of the data supply systems 44 and 48 is to convert the instructions either manually applied or automatically furnished on coded tape into controlling signals capable of adjusting or modulating the pulses generated by the clock system in accordance with the instructions received. The resulting adjusted pulses are used as command pulses for controlling the moving parts of the machine with which the director is associated, such as the pulse-code-to-analog servo-mechanisms 50, 52 and 54 of the machine illustrated herein. These servo-mechanisms in turn furnish synchro data to the machine drive servomotors 28, 30 and 32 which as previously described control the moving parts 14, 20 and 24 of the machine tool. Return circuit channels may be provided as indicated in dotted lines at 82, 84 and 86 for the purpose of signalling the data supply system 44 to stop the flow of command pulses in the event of any malfunction preventing proper responses. The checking signals furnished by the channels 82, 84 and 86 are conveyed to the central control 74 as indicated by the extensions of the dotted lines to that element. In addition, a return line 88 may be provided which connects the "Y" axis machine driven servo-mechanism 30 with the central control 74 to furnish a command signal for retracting the cutter under circumstances preventing the stopping of the machine under control.

As herein illustrated, the three power servomotors 28, 30 and 32 perform the function of positioning the shaping tool or cutter 26 with respect to the workpiece on the machine table 14. In terms of the bridge-type of planer mill being considered herein, it is understood from the previous description that one servomotor, such as the unit 28, positions the table in the longitudinal direction; that a second servomotor, such as the unit 30, positions the rail 20 in a vertical direction with respect to the table; and the third servomotor, such as the unit 32, positions the shaping or cutting tool 26 in the transverse (cross feed) direction of the machine. It is understood that the power units or machine drive servomotors are capable of accomplishing their positioning functions in the presence of cutting force reactions of considerable magnitude.

*Group Relation of Functional Components of Control System*

The general assemblage of the major components of the control system has been heretofore described in connection with FIGS. 1, 2 and 3. There follows a more completely integrated charted representation of the control system and showing its application to one of the pulse-code-to-analog servo-mechanisms and the machine drive servomotor associated therewith. FIGS. 4 and 5 together illustrate a more comprehensive block diagram of the control system showing the functional components of the system and the interconnections therebetween including control and checking channels as well as the main signal channels.

Referring particularly to FIGS. 4 and 5, it is noted that FIG. 5 is a continuation of the block diagram of FIG. 4 and shows the interconnection of one pulse-code-to-analog servo-mechanism and the power servo-mechanism controlled thereby with the command, checking and control circuits of FIG. 4. The pulse-code-to-analog servo-mechanism selected for illustrative purposes is the one controlling motions along the "X" coordinate of the machine, namely, servo-mechanism 50. The machine drive servo-mechanism 28 is operatively associated therewith and as previously described controls the movement of the machine table 14. It is understood, as shown by the separate command pulse channels leading from the data supply system 44 in FIG. 3 that the two remaining servo-mechanisms 52 and 54 and their respective servo-motors are similarly operatively connected to the command, checking and control circuits of FIG. 4.

The component systems of the director hereinabove described in connection with FIG. 3 are shown in more detail in FIGS. 4 and 5. The box outlines for the components in FIG. 3 are employed in FIGS. 4 and 5 but in larger scale and with more particularity. The central control panel 74, the clock system 42, the automatic data supply system 44, and the manual data supply system 48 are represented by separate boxes in the block diagram of FIG. 4. Similarly, the pulse-code-to-analog servo-mechanism 50 and its associated power servo-motor 28 are shown in box outline in FIG. 5.

The several systems illustrated in FIG. 4 are interconnected by command, checking and control circuits as indicated by the various channels running from one to the other. The central control panel 74 contains control elements such as push buttons and indicating elements such as electric lamps which are connected by various channels to different units of the several systems. Certain of the control elements serve to start and stop the machine and to select either the manual or automatic data supply systems for operation. Electric signal lamps are also provided for identifying any malfunctioning of the machine to the operator.

The clock system 42 includes a clock oscillator 90 which serves as the primary pulse source for the operation of the control system. Also included in the clock system are two frequency dividers or pulse distributors, 92 and 94. These are referred to as the first frequency divider 92 and the second frequency divider 94. It will be noted in FIG. 4 that the clock system has other operating elements, several of which are interposed between the two frequency dividers. These operating elements comprise a start-stop circuit 96, a clock cycle control 98, and a divider check circuit 100. The main signal channel is directed from the clock oscillator through the initial or first frequency divider 92, thence through the start-stop circuit 96 and the clock cycle control 98 to the second frequency divider 94. The design and function of the newly cited operating elements of the clock system are described in detail hereinafter.

The clock oscillator 90 generates a series of pulses which are usually delivered regularly spaced in time. These pulses are sent out to the first frequency divider 92 and thereafter some of these pulses are delivered to the second frequency divider 94. Each pulse generated by the clock oscillator potentially represents an instruction to move a part of the machine one unit of distance. In the illustrated embodiment of the invention not every pulse is used as an instruction for moving a controlled element. Usually only a relatively small number of pulses generated within a prescribed time are utilized as "command" pulses as hereinafter described. Since each pulse characterizes a movement of one unit of distance, the oscillator frequency of the pulses may be viewed as a distance per unit of time or as a velocity. The pulse frequency generated by the clock oscillator 90 may be set to correspond to a velocity preferably slightly in excess of the maximum feed rate of the machine under control as hereinafter explained.

The clock oscillator 90 is regulated by the control element 66 on the central control panel 74. The purpose of this control element is to obtain variable feed rates for the movable parts of the machine tool. For this purpose, the clock oscillator may be made continuously variable over two bands. One band of adjustment covers five hundred to twenty-five hundred pulses per second and the other band covers one thousand to five thousand pulses per second. Each pulse generated by the clock oscillator 90 may be of any form but preferably is half sinusoidal and the duration may be ten micro-seconds at its base. The pulses generated by the clock oscillator are conveyed by channel 104 to the first frequency divider 92.

In general, the function of the first frequency divider 92 in the clock system is to divide the pulses received from the clock oscillator, sending certain synchronizing pulses out on the channel 80 to the pulse-code-to-analog servo-mechanisms and on a channel 442 to the divider check circuit 100, and the remaining pulses to frequency divider 94. Pulses conveyed to frequency divider 94 are potential command pulses for governing the action of the pulse-code-to-analog servo-mechanisms.

The potential command pulses furnished by the first frequency divider 92 are delivered along the channel 108 in the clock system to the unit referred to as the start-stop circuit 96. In general, the function of the start-stop circuit is to control the flow of potential command pulses to the clock cycle control unit 98. When the machine is ready to operate, a signal conveyed over channel 110 from the control panel 74 to the start-stop circuit allows the flow of pulses on channel 108 to go to the clock cycle control along channel 112. When the machine is to be stopped, a signal from the control panel 74 to the start-stop circuit will shut off the flow of pulses from channel 108 to channel 112.

In general, the function of the clock cycle control unit 98 in the clock system is to adjust the duration of one clock cycle to the length of the cut desired in one machine cycle. The machine is preferably provided with a choice of a plurality of fixed clock cycles anywhere between a maximum duration at the nominal clock cycle rate and a minimum duration of considerable shorter time. In the illustrated embodiment of the invention, the machine has a choice of eight fixed clock cycles between 2 seconds and 256 seconds in duration. The purpose of providing a plurality of fixed clock cycles is in order to be able to adjust the cycle time long enough to do a particular operation and thus conserve time. For example, the clock cycle control unit may provide a relatively long cycle time for making one long straight line cut from a single block of data on the tape. For making shorter cuts, the clock cycle unit may provide a short cycle time so that the machine does not consume the maximum clock time allotted, such as 256 seconds.

The second frequency divider 94 in the clock system receives its pulses from the clock cycle control over channel 114, and functions to generate on separate lines, a pattern of pulses which, in accordance with settings in the automatic or manual data supply system, may or may not be used as command pulses for the pulse-code-to-analog servo-mechanisms. This is explained in detail hereinafter. Those pulses which are used for command purposes are transmitted over channel 78 to the automatic and manual data supply systems. Frequency divider 94 also generates an end carry pulse which signifies the end of a clock cycle. This last pulse is returned by the channel 116 to the clock cycle control 98 and thence from there along channel 118 to the automatic data supply system 44 where as hereinafter described it will signal the tape reader or other data sensing means to advance and read the next successive instruction on the tape.

In general, the divider checking circuit 100 in the clock system functions to check the second frequency divider 94 and the second stage of the first frequency divider 92. It serves to guard against the loss of a possible command pulse and, hence, against integration errors in converting rate commands to position commands. If in checking these frequency dividers, the checking circuit 100 determines there is an unaccounted or missing pulse, it will send out an alarm pulse over channel 120 to the start-stop circuit causing the latter to stop the flow of potential command pulses over channel 112. The two frequency dividers 92 and 94 may be considered together to form a single binary frequency divider of various stages, depending upon the setting of the clock cycle control.

The automatic data supply system 44 as diagrammatically shown in FIG. 4 comprises the tape reader 46, a data distributor 122, a command data converter unit 124 containing banks of information storage registers as hereinafter described, and a manual-automatic control unit 126 from which command pulses are delivered by channel 128. Since in the block diagrams of FIGS. 4 and 5 the control system is shown as governing the action of the pulse-code-to-analog servo-mechanism 50 for the "X" or table axis and its associated power servomotor 28, FIG. 5 illustrates these two component parts of the system and the delivery of command pulses thereto by way of channel 128. It is understood that the two remaining pulse-code-to-analog servo-mechanisms 52 and 54 and their respective servomotors 30 and 32 are similarly controlled from the data supply systems.

The function of the tape reader 46 or other device for sensing coded information is to convert information stored on tape to a form acceptable to the data distributor 122 and the data converter 124 for each axis of the machine. The reader scans the machine orders on the information storage medium, such as the punched holes in the tape, and converts the pattern of coded information into pulses transmitted simultaneously over a selected combination of output lines over channel 130 and leading from the tape reader to the data distributor 122.

The primary function of the data distributor 122 in the automatic data supply system is to route or distribute the tape reader signals representing successive lines of tape data over channel 132 to the command data converter until 124, where the corresponding digits of the machine control orders are stored. Its secondary functions are to control the tape reader so that the proper number of lines are read from the tape at the proper times, and to signal the control circuits of the panel 74 in the event of certain errors arising in the automatic data supply system.

The function of the command data converter unit 124 is to control the transmission of the proper number of control-register pulses to the separate pulse-code-to-analog servo-mechanisms 50, 52 and 54. In the charted representation illustrated in FIGS. 4 and 5, the control system is shown as applied to the servo-mechanism 50 for actutaing the table 14 of the machine tool along the "X" axis. The command data converter unit contains two sets or banks of alternately operable registers for each coordinate axis of the controlled machine. The pulses desired from either bank of registers, whichever is in operation during a particular clock cycle, are transmitted over channel 134 to a manual-automatic control unit 126.

The function of the manual-automatic control unit 126 is to determine the source of command pulses for the selected pulse-code-to-analog servo-mechanism. The control unit 126 is actuated to feed pulses from either the automatic or manual data supply systems 44 and 48 by means of a signal sent over channel 136 from the central control panel 74. The manual-automatic control unit 126 may include three relays, one for each axis. These relays may be arranged so that when de-energized the pulses from the manual data supply system are furnished to the selected servo-mechanism and when energized by a signal on channel 136 the relays connect channel 134 to one or more pulse converting servo-mechanisms 50, 52 and 54.

The manual supply data system 48 includes a command data converter unit 138 which functions similarly to the data converter unit 124 to gate the desired pulse rates from channel 78 over which the pulses from frequency divider 94 are transmitted. The manual command data converter may comprise the bank of switches 62 previously described in connection with FIG. 1. In the illustrated embodiment of the invention, eighteen manually operated toggle switches are employed in the bank which will accommodate command orders having seventeen binary digits and the directional sense digit of either a plus or a minus sign. As in the case of automatic data command converter unit 124, the three command numbers for the separate axes of the machine represent the position increment in each axis necessary to move the machine from its present position to a new position.

Each pulse-code-to-analog servo-mechanism of the illustrated embodiment of the invention comprises as shown in the block diagram of FIG. 5 an electrically and mechanically connected group of units referred to as a summing register 140, a decoder 142, an amplifier servomotor 144, a synchro-transmitter 146, and interconnecting servo gearing 148 between the servomotor and the synchro-transmitter. In addition, each pulse-code-to-analog servo-mechanism includes a feed-back mechanism schematically shown in FIG. 5 as a position coder 150 and a position code converter 152. Although the servomotor of the unit 144 may be directly connected to the element or machine part under control, in the illustrated embodiment of the invention each pulse-code-to-analog servo-mechanism operates through a machine drive servo-mechanism, such as shown in block outline in the lower portion of FIG. 5.

Each machine drive servo-mechanism is shown in the present form of the invention as comprising a synchro receiver 154, an amplifier and servomotor 156, and machine feed gearing 158 connecting the servomotor with the controlled part of the machine. In addition, each machine drive servo-mechanism includes machine data gearing generally indicated at 160 and limit stops characterized by the box outline at 162. Synchronizing data is transmitted between the pulse-code-to-analog servo-mechanism and its associated machine drive servo-mechanism over channel 164.

It is to be noted that command pulses delivered over channel 128 from the automatic data supply system 44 are directed to the summing register 140 where they are compared against response pulses arising out of the position code converter 152. The channel 80 over which synchronizing pulses are sent from the first frequency divider 92 is connected to both the position code converter 152 and the position coder 150.

*Clock System and Control Registers*

FIG. 6 illustrates a simplified schematic block diagram of the operating relation between the clock system and the control registers of the data supply system and is intended to illustrate how the instructions, whether recorded on storage medium, such as punched tape and the like, or manually operated, are converted into a series of pulses which serve as the input to controlled elements such as the servo-mechanisms 50, 52 and 54. The basic parts of this operating relationship are embodied in four principal units: the master or clock oscillator 90 forming part of the clock system 42 described in connection with FIG. 4; the pulse distributor generally referred to as the first frequency divider 92; the pulse distributor generally referred to as the second frequency divider 94; a pulse modulator for each axis of the machine schematically represented in FIG. 6 by dotted outlined boxes 166, 167 and 168; and mechanism for reading the stored information such as the tape reader 46. Except for the tape reader or other means for sensing the stored information, the basic elements of this relation are shown in FIG. 6.

As previously described the clock oscillator generates a series of pulses, some of which are separated by frequency divider 92 and delivered to channel 80 as synchronizing pulses and the balance of which are delivered over channel 114 to the second frequency divider 94. The latter pulses are potential command pulses.

The first frequency divider 92 may consist of two standard electronic flip-flop devices 170 and 171, each supplying pulses on separate lines when a change of state occurs. The first flip-flop 170 is triggered by every output pulse from the oscillator and the second flip-flop 171 is triggered when the first flip-flop changes from a "1" to a "0." Pulses which are generated when a flip-flop changes from a "0" state to the "1" state may be considered as non-carry pulses and those which occur when a flip-flop switches from "1" to "0" may be designated as carry pulses.

In the illustrated embodiment of the invention, two standard flip-flops are used in frequency divider 92. Non-carry impulses from each flip-flop are sent out over channels 80 and 106 to the divider-checking circuit 100 and to the position coding devices of each pulse controlled servo-mechanism as hereinafter described. Carry pulses from the first flip-flop 170 trigger the second flip-flop 171. Carry pulses from the second flip-flop are sent out on channels 108, 112 and 114 to the second frequency divider 94 as potential command pulses. FIG. 8 graphically illustrates the pulse division occurring in frequency divider 92 and particularly the timing of the pulses following the condition when both flip-flops are in the "0" state. Odd-numbered impulses from the clock oscillator become non-carry pulses from the first flip-flop 170. Even-numbered pulses from the clock oscillator become carry pulses from the first flip-flop and, hence, input pulses to the second flip-flop appear as non-carry pulse outputs of the second flip-flop, while the even-numbered input pulses to the second flip-flop become carry-pulse outputs of the second flip-flop. The result is that for the two-stage type of flip-flop circuit illustrated for frequency divider 92, one out of every four consecutive pulses generated by the clock oscillator becomes a potential command pulse while the remaining three pulses are employed for response and checking purposes.

Referring to FIG. 6, the second frequency divider 94 has a plurality of output lines 172, there being seventeen output lines employed in the illustrated embodiment of the invention herein. Each output line 172 carries a pulse train whose rate is less than that generated by the clock oscillator 90 by a definite ratio. All of the ratios of the output lines 172 in the illustrated embodiment of the invention are integral powers of two.

The frequency divider 94 includes a series of flip-flop electronic devices 174 for alternately sending one pulse along its respective output line 172 and the next succeeding pulse along a line 176 to the next succeeding flip-flop device. This last flip-flop device divides the pulses thus received and sends every alternate pulse along its output line 172 and the remaining pulses along line 176 to the next succeeding flip-flop. This division by two occurs throughout the remaining flip-flop devices in the frequency divider 94, the result being that half of the pulses furnished each flip-flop device 174 are sent out over the output lines 172 and the other half are transmitted to the next successive flip-flop device in the divider circuit.

FIG. 9 graphically illustrates the operation of frequency divider 94 where, for the sake of simplicity, only four stages are shown. For both modes of machine operation (manual or automatic) ten to seventeen of the flip-flops are used. The first stage will divide the input-pulse-repetition frequency by two, the second stage by four, the third stage by eight, et cetera. The non-carry pulses from each stage are sent over its output line 172 to gating circuits and the remaining carry pulses are sent to the next stage.

I, for example, the clock cycle of the pulses delivered to the seventeen stage divider 94 consists of 131,072 pulses, these pulses will be distributed through the output lines 172 in a progressive ratio from one end to the other end of the stage of flip-flops. As previously mentioned, the division ratio of the pulses over the output lines are of integral powers of two, as shown in the following table:

| Output lines 172: | Pulses per cycle |
|---|---|
| 1 | 65,536 |
| 2 | 32,768 |
| 3 | 16,384 |
| 4 | 8,192 |
| 5 | 4,096 |
| 6 | 2,048 |
| 7 | 1,024 |
| 8 | 512 |
| 9 | 256 |
| 10 | 128 |
| 11 | 64 |
| 12 | 32 |
| 13 | 16 |
| 14 | 8 |
| 15 | 4 |
| 16 | 2 |
| 17 | 1 |

The last flip-flop stage in the frequency divider 94 develops two successive pulses, the first pulse of which is sent along its output line 172 and the second or last distributed pulse of a given cycle is sent out over channel 116. As previously described this last distributed pulse signifies the end of each clock cycle and is employed for controlling the tape reading mechanism for causing it to advance the tape for reading the next successive block of information thereon.

Each of the output lines 172, there being seventeen such lines in the illustrated embodiment of the invention, is divided into as many branches as there are axes under control. In this instance each output line is divided into three branches 178, 180 and 182, corresponding to the "X," "Y" and "Z" axes of the machine. Each branch line is connected to the input of a gate circuit indicated respectively at 184, 186 and 188. The gate circuits for each axis are under the control of a separate modulator indicated schematically in dotted outline. The output lines from the gate circuits for each axis lead to a common pulse delivery line. The pulse delivery line for the "X" axis has already been identified as 128. The pulse delivery line for the "Y" and "Z" axes are indicated respectively at 190 and 192. It is evident that by opening the appropriate combination of gates 184, 186 or 188, the pulse combination to each axis control mechanism may be changed, either automatically or manually, to convey the desired commands to the data supply systems.

The various gate circuits 184, 186 and 188 may be set either in accordance with instructions on punched paper tape and the like for completely automatic operation of the machine or may be manually set in accordance with the positions of a bank of toggle switches such as indicated at 62 on the front panel of section 60 of the director 12. The tape and the tape-reading mechanism serve the function of feeding into the system the signals required to set the gate circuits. Each time the frequency divider 94 completes a "clock cycle," a new set of data is read into the gate circuits. To vary the period of time of the clock cycles, such as when shorter command numbers are set into the system, the number of stages in the clock divider may be altered to any number less than the total number of flip-flop output lines 172 at the start of each cycle. Associated circuits and component elements will provide for proper sequency, continuous operation of the machine from intermittently read tape, and the checking of the instructions as they are transferred from the tape into storage relays which are employed to set the gate circuits as hereinafter described.

The tape is read line by line and a stepping switch distributes the tape data to a selected storage relay register in the data distribution unit 122 which, in turn, sets the gate circuits 184, 186 and 188 in the frequency divider 94. As will be described hereinafter, it is preferred to provide two storage relay registers in the system. While one register is being set by the tape reader, the other is holding the gate circuits in the frequency divider 94. The two storage registers are arranged to function alternately between successive clock cycles.

There has been described in FIG. 6 the general operation of the clock system and its control by data supplied either manually or automatically. It is evident that a series of pulses which may be equally spaced in time are generated by such means as the clock oscillator 90 and these pulses are divided into a series of circuits each successively carrying a lesser number of pulses by integral power of two. Every alternate pulse, such as the odd numbered pulses, are fed to the gate circuits 184, 186 and 188 illustrated in FIG. 6 which are either opened or closed depending upon the instructions manually or automatically fed thereto. The gate circuits are opened or closed by the binary coded instructions furnished on the tape or on the manual switches. The output received by the common transmitting lines 128, 190 or 192 from the gate circuits is the total number of pulses passing through the closed gate circuits and represents the increment of distance which is desired to move one or more parts of the machine controlled by the circuit.

*Automatic Data Supply System*

As illustrative of a desirable mechanical and electrical system for sensing the recorded information stored on tape or like material and for transmitting such information in two sets of storage registers for each axis of the machine, there is shown in FIG. 7, a schematic arrangement of the parts of the automatic data supply system. The tape reading mechanism and the tape data distributor for routing the tape read signals may be of conventional design satisfactory for use in the control system.

Referring particularly to FIG. 7, the information storing medium herein illustrated comprises a punched tape 200 containing longitudinally spaced apart series of lines or punched holes 202 extending transversely across the tape. The tape may be a long strip of paper fed from a roll of tape and wound up on a second roll as it is used. The punched lines on the tape may be considered as subdivided into regions or blocks of holes each representative of an instruction to one or more of the controlled parts of the machine. The tape has the function of storing the computed orders until they are needed by the machine tool.

The tape 200 is longitudinally advanced by means of a sprocket wheel 204, the teeth thereof being arranged to engage in a series of small holes 205 disposed near the longitudinal medial line of the tape. As hereinafter described, the tape is intermittently advanced by the sprocket wheel when control pulses are received indicating completion of one cycle of operation. The tape reader 46 contains a plurality of sensing pins 206 arranged in a row transversely of the tape and corresponding in number to the maximum number of holes possible in each transverse series of holes. Each pin 206 is spring urged against the tape and whenever one of the pins encounters a punched hole in the tape, it will be projected therethrough as shown for example by the leftmost pin in FIG. 7.

Operatively associated with each pin is an electrical switch which is closed when the pin projects through the tape but otherwise remains open in any other position of the pin. Each switch may comprise a pair of flexible contact members 208 and 210 disposed in superimposed relationship to one another. One of the contact members, such as the lower member 210, is longer than the other member and extends in engagement with the sensing pin with which it is associated. When the pin projects through a hole in the tape it moves the contact member 210 into engagement with its companion contact member 208 to close a circuit. Any suitable means is provided for supporting the contact members such as the insulating block 212 which as shown may be located under the tape in transverse relation thereto.

Each switch represented by a pair of contact members 208 and 210 is connected by a separate line such as that indicated at 214 to a read selector unit 216 where each line is divided into two branches 218 and 220. The branch lines 218 for all the switches lead to one data distributor in the form of a stepping switch 222 and the other branch lines 220 lead to a second similar stepping switch 224. The stepping switches are of conventional construction and separately distribute the data through conduits 226 and 228 containing a multiplicity of electric wires leading to an information storage unit generally indicated at 230.

The information storage unit 230 contains as many command-data converters as there are axes on the machine tool under control. In the illustrated embodiment of the invention, three such converters are employed, one for each "X," "Y" and "Z" axis of the machine tool exemplified herein. Each of the three data converters consist of two sets of digit relay storage registers designated the "A" and "B" registers. The two sets of registers associated with each data converter function alternately, one controlling the machine while the other is being set to the proper value of one of the data distributors 222 or 224 and the tape reader 46 during each clock cycle.

In the example of the invention described herein, each relay register "A" or "B" comprises eighteen digit storage relays. The first digit of each command number furnished to the register by either stepping switch represents the direction of the motion of the machine part to be controlled and the remaining seventeen digits of the command number represents, in binary form, the number of control register pulses to be transmitted for controlling an axis of the machine tool. Each digit of each command number is stored by one relay of the register. A "one" of the binary number is represented by an energized relay; a "zero" of the binary number is represented by a de-energized relay. Each set of relays in each data converter is cleared, set, and checked by one or the other stepping switches 222 or 224 and the tape reader 46 on alternate clock cycles.

As previously described, the data converter for each axis of the machine tool is provided with two sets or banks of relay storage registers "A" and "B." For example, the "X" axis is provided with "A" and "B" registers indicated respectively at 232 and 234 in the storage unit 230 of FIG. 7. Similarly, the "Y" axis is provided with "A" and "B" registers 236 and 238 respectively, and the "Z" axis is provided with "A" and "B" registers 240 and 242 respectively.

The circuits leading through conduit 226 and 228 from the stepping switches 222 and 224 are properly distributed to the banks of relay registers as shown schematically in FIG. 7. Those circuits leading from stepping switch 222 are connected to the "A" registers of the "X," "Y" and "Z" axes, and the circuits leading from the stepping switch 224 are connected to the "B" registers of each of the axes. Only one bank of registers "A" or "B" of one or more axes is set by the tape reader for each information block on the tape. While the selected banks of registers are being set by the tape reader, the remaining register banks are functioning to hold the gate circuits of the frequency divider 94 as provided by the previous transverse line of holes in the tape. The registers "A"

and "B" of the data converters alternately function between successive clock cycles and control means is provided as hereinafter described for alternately switching from the "A" register to the "B" register and back to the "A" register as the tape is read block by block.

As described in connection with FIG. 6, seventeen relays of the registers "A" and "B" of each axis control the gate circuits 184, 186 and 188 of the frequency divider 94 either opening or closing the same. Each gate circuit is open when its associated relay in the register is energized and closed when the relay is de-energized. The one remaining relay in each bank of registers is employed to control the direction of movement of the machine part or parts and determines whether such part should move in a plus or minus direction.

Mounted on the storage information unit 230 are three register selector units indicated at 244, 246 and 248 which are operatively associated with the "X," "Y" or "Z" axes respectively of the machine. Depending upon which registers "A" or "B" are in operation at the particular time, each selector unit receives information from the registers and delivers the same to the pulse-code-to-analog servo-mechanism associated with the particular axis in question. Also located in the arrangement shown in FIG. 7 is a data supply control unit 250 which functions over channel 252 for signalling which of the register selector units 244, 246 and 248 is to operate in a particular cycle of operation.

The data supply control unit 250 is electrically associated with the tape reader and by line 254 receives the reader response signals to the tape reader. The end carry pulse channel 116 described in connection with FIGS. 4 and 6 is connected to the control unit 250 for indicating the completion of a clock cycle. When the last pulse of a cycle is received by the control unit it informs the tape reader that an advance should be made to the tape to bring the next block of punched holes thereon into alignment with the sensing pins 206. The data supply control unit 250 is also electrically connected to the read selector unit 216 by channel 256 which then branches and is separately connected to the two stepping switches 222 and 224. This line serves to convey signals to the stepping switches to advance them for the next line on the punched tape.

It is apparent from the previous description and particularly concerning FIGS. 4, 5 and 6, that there are two basic means of feed rate adjustment. One of these means is the clock oscillator 90 which controls the maximum feed rate instruction which may be applied to any axis of the machine. The frequency of this clock oscillator is adjustable and this adjustment may be used to scale up or down within limits the feed rates to all three axes simultaneously without affecting the coordination between the three feed mechanisms of the machine tool. The other basic means of feed rate control are the manual and automatic data supply systems 48 and 44. The adjustments provided by either of these two data supply systems may be considered to be ratios. Each ratio means that the speed of one motion is a fraction of the maximum speed determined by the clock oscillator frequency. By multiplying each feed-rate instruction by the same constant factor, the feed-rate is changed without affecting the coordination between the three feed mechanisms of the machine tool. The altering of the feed rate instruction is always performed before setting the instructions into the machine (for manual operation) or before coding the tape or other form of information storage media (for automatic operation).

The three pulse-code-to-analog servo-mechanisms 50, 52 and 54 receive command pulses from either the "A" or "B" registers of the data converters. The received information specifies the desired motion of each machine feed and first appears as a time series of electrical pulses. Each pulse in the series represents an instruction to each servo-mechanism to move a unit of distance (an equivalent, for example, of 0.0005" of machine feed). As hereinafter described, two electrical conduits or bus wires carry these pulses to each servo-mechanism. Pulses on one bus wire represent motion in the plus direction and pulses on the other bus wire represent motion in the negative direction. The series of pulses are converted to an equivalent mechanical shaft angle to drive the synchro transmitters of the servo-mechanisms 50, 52 and 54. The means of conversion is to generate pulse information in accordance with the actual shaft angle and to compare it with pulse information representing the desired shaft angle. The difference or error between the actual and desired quantities is used to correct the actual angle so that the difference approaches zero under all conditions of position, velocity, and acceleration. This difference appears in the present embodiment of the invention as a voltage which is amplified and converted as hereinafter described to vary the speed of the machine-feed servomotors 28, 30 and 32.

It is apparent that by using the different supply systems, whether manual or automatic, the operator can cause the machine to traverse in a straight line within the physical limits of machine travel with a single setting of the different converters. Each of the three command numbers on the coded tape represents position increments in one axis necessary to move the controlled part of the machine from its present position to a new position. During the clock cycle in which these numbers are obtained, the machine will automatically divide the total increment in each axis into unit pulse lengths and distribute these in time in a standard predetermined manner. The result will be a close approximation to a straight line in space passing from the initial position to the final position. If a curved machine trajectory is desired it is necessary to divide it, a priori, into straight segments and traverse each straight segment in the manner hereinbefore described.

*Information Storing Medium*

The information storing medium selected for the illustrated embodiment of the invention is punched tape. It is understood that other suitable means, such as magnetic tape, photographic film, et cetera, may be substituted for the selected medium. The coded information on the punched paper tape 200 or other form of instruction storing medium has the control data therein spatially arranged both longitudinally and laterally of the tape. A typical punched tape capable of use in the present invention and similar to that shown in FIG. 7 is illustrated and identified by the same reference character in FIG. 17. The feed or sprocket wheel 204 engages in holes 205 which extend approximately down the middle of the tape. The balance of the paper strip contains the control or digit holes 202 through which the sensing pins 206 project. One transverse line of digit holes may consist of a series from zero to seven holes. Ten such transverse lines of holes may occupy one running inch of the tape. In each transverse series of holes, a digit hole represents a binary "one" while the absence of a hole in the series represents a binary "zero." In order to check against faulty tape and faulty operation in the tape reader and relay circuits, the pattern of holes punched in the tape not only include the machine orders but also checking orders. In the tape illustrated in FIG. 17, the machine orders are written in three adjacent columns along one side of the sprocket holes 205 and the checking orders are written in four adjacent columns along the opposite side of the sprocket holes. Thus, in the illustrated type of tape the maximum number of holes, exclusive of the sprocket holes, that may appear in each transverse series of holes, is seven.

The machine orders for the diffeernt axes of the machine tool are preferably arranged in adjacent columns extending longitudinally of the tape or other coded media. Thus the "X" axis orders may appear in column 1, the "Y" axis orders in column 11, and the "Z" axis orders in column 111. The columns on the opposite side of the sprocket holes are available for use in checking columns 1, 11 and 111. Thus, each transverse line of holes on the tape may hold one digit of each axis command number and a four digit checking number to insure against erroneous readings of any of the seven digits.

The tape is divided longitudinally into regions or blocks of varying lengths depending on the cycle time. Each block may consist of from twelve to nineteen transverse lines of holes 202 on the tape. One of the transverse lines of holes in each block, preferably the first line, may contain such overall machine orders as the clock-cycle time orders, et cetera. The second line may contain the directional sense digits together with their checking number for indicating the direction of movement (whether positive or negative) of the machine part to be controlled. The third and succeeding lines carry the command numbers for indicating the extent of movements of the machine parts along their respective axes.

In the illustrated embodiment of the invention there are seven outgoing lines 214 leading from the tape reader to the read selector unit 216. Three of these seven lines are used to send signals alternately through one or the other of the two stepping switches, which signals correspond to the significant digits on the tape. The remaining outgoing lines are employed for checking purposes as more particularly described hereinafter for checking the operation of the registers in the data converter units. In addition, a reading cycle is initiated by a signal over channel 254 extending between the data supply control and the tape reader. This "read" signal is activated by the end carry pulse sent out over channel 116 from the second frequency divider 94 and causes the engagement of an appropriate driving clutch in the reader for advancing the tape. The "read" signal remains "on" during the reading of a block of information on the tape causing the tape to be advanced line by line until the "read" signal is removed at the end of an information block. As each transverse line of punched holes is ready by the tape reader it sends a pulse on channel 254 to the data supply control unit which in turn directs the appropriate stepping switch to advance one step. Although the tape reader may operate at different speeds, it is designed in the present embodiment of the invention that the tape reader reads at approximately twelve lines per second. In the shortest two-second cycle time, this speed is ample to read nineteen lines of tape that may constitute the longest block of information.

The data distribution system 122 is controlled by transfer pulses from the control circuits of the central control panel 74 and by pulses from the tape reader. Each operating cycle is initiated by a transfer pulse received from the control circuits of the panel, which in turn is initiated by the end carry pulse sent over channels 116 from the second frequency divider 94. Each transfer pulse causes the control system to shift from "A" data converter register to the "B" register, or vice versa, clears the register just released, and starts the tape reader. The stepping switches 222 and 224 constitute parts of the data distributing system shown in FIG. 4. The tape reader digit and checking signals pass through the stepping switches which in turn are driven by the line-by-line tape reader pulses. The result is that each stepping switch advances one step for each line on the tape, thereby distributing the digit and checking pulses to the proper relays. It is desired to have the first line of data in an information block on the tape set a group of relays which determine the block length. When the selected stepping switch reaches the point corresponding to the last line of data in the block, the "read" signal is interrupted, the reader stops and the stepping switch is reset to zero. A push button 258 or other form of control may be provided on the panel 74 for manually clearing the stepping switches and register converters if necessary.

*Machine Control Elements*

The general arrangement of the components of the control system and their interrelation to one another have been described in connection with FIGS. 4 and 5. There follows a more detailed description of the pulse-code-to-analog servo-mechanisms and the machine drive servo-mechanisms. Since these servo-mechanisms are alike as applied to all three axes of the machine, the explanation of the control of one of these axes, such as the table axis, will suffice for the remaining two axes of the machine illustrated herein.

In FIG. 10, the machine table 14 is provided with a drive nut 300 which is normally secured to the underside thereof but which in FIG. 10 is shown schematically displaced therefrom for the purpose of clarity. Extending through the drive nut is a lead screw 302 which is supported at one end by a journal block 304 secured to a fixed part of the machine. Rotation of the lead screw relative to the drive nut will cause the latter to move axially on the threads of the lead screw and to move the table 14 therewith longitudinally of the machine. The opposite end of the lead screw is provided with a gear wheel 306 which is operatively coupled to a shaft 310 through the machine feed gearing generally indicated at 158 and previously described in connection with FIG. 5. Axially aligned with the shaft 310 is a shaft 312 which is driven by a constant speed electric motor 314. The two adjacent ends of the shafts 310 and 312 are enclosed by a housing 316 containing a variable speed hydraulic transmission operatively coupling the drive shaft 312 with the driven shaft 310. Associated with the variable speed hydraulic transmission 316 is a control unit 318 for varying the stroke of the hydraulic transmission. The latter unit may be secured to the underside of the transmission housing as shown in FIG. 10. The transmission stroke control 318 is regulated by signals transmitted along the line 320 from an amplifying unit generally indicated at 322. The latter together with the motor 314 and the transmission 316 constitute the unit 156 described in connection with FIG. 5. The signals from the synchro transmitter 146 of the pulse-code-to-analog servo-mechanism associated with "X" axis of the machine are transmitted along channel 164 to the amplifier unit 322 where they are amplified and conveyed by line 320 to the transmission stroke control 318.

Feed-back means is provided for comparing the actual position of the table 14 with the desired position furnished by the synchro transmitter 146. The table position take-off may be of any suitable character. It is shown in FIG. 10 as a rack bar 326 which normally is secured to the underside of the table 14 but as shown in FIG. 10 is displaced therefrom for purpose of clarity. The rack bar is operatively coupled to the synchro receiver 154 through machine data gearing generally indicated at 160. Signals from the synchro receiver 154 are conveyed by channel 328 and compared against the output command signals of the synchro transmitter 146. The circuitry for this purpose may be of any conventional kind, such as that illustrated in FIG. 10A. The resulting difference or error signal is amplified by unit 322.

A pulse-code-to-analog servo-mechanism for controlling any one of the machine drive servo-mechanisms 28, 30, and 32 is shown in FIG. 11. It will be assumed for the purpose of this description that the servo-mechanism illustrated in FIG. 11 is that related to the table feed mechanism and drives the synchro transmitter 146. As previously described the signals from the transmitter are conveyed by channel 164 to the amplifying unit 322. The input shaft of the synchro transmitter is indicated at 340 and is operatively coupled by the synchro gearing 148 to a shaft 342. Connected to the shaft 342 and driving the same is a two-phase servomotor 344. The latter is magnetically influenced by an electric circuit 346 of an amplifying and compensating network system identified at 348. This system together with the servomotor 344 constitute the amplifier and servomotor unit 144 previously described in connection with FIG. 5. The summing register 149 and the decoder 142 are electrically connected to one another and to the amplifying system 348 as schematically shown in FIG. 11. Command pulses are fed to the summing register 140 from the manual automatic control unit 126 along channel 128. Before reaching the summing register 140 the channel 128 is divided into two branch lines 352 and 354, the former for sending command pulses in a plus direction and the latter for sending command pulses in a minus or opposite direction. A sensing relay 356 is connectible to the directional sense relay of either the "A" or "B" storage registers associated with the "X" axis of the machine and is operable to throw a switch 358 to either the branch line 352 or the branch line 354 depending upon whether the part under control, such as the table 14, should be moved in a plus or minus direction.

Mounted on the input shaft 340 of the synchro transmitter 146 is the control device previously referred to in FIG. 5 as the position coder 150. Synchronizing pulses separated from the clock system 42 by the first frequency divider 92 are conveyed by channel 80 to the position coder. In the illustrated embodiment of the invention, the position coder 150 includes a circularly shaped member or commutator 360 which is fixed to the input shaft 340 of the synchro transmitter for joint rotation therewith. Mounted on the periphery of the commutator are a plurality of circularly spaced apart electrical conducting elements or segments 362 connected to a common slip ring 363. Bearing upon these segments are three contacts or spring loaded roller type brushes indicated at 364, 366, and 368 and more explicitly shown in FIG. 12. These brushes are separately connected by lead lines 370, 372, and 374, respectively, to the position code converter 152. Riding on the common slip ring is a fixed brush 376 which is connected to channel 80 and through which the synchronizing pulses separated from the original pulse stream by the first frequency divider 170 are fed. As hereinafter described in connection with FIG. 12, the synchronizing pulses delivered to the commutator 360 are distributed to one of the brushes 364, 366, and 368 whichever happens to be in contact with a conducting segment 362. The width of the conducting segments and the circumferential spacing the three brushes are such that only one brush contacts a conducting segment at a time. The arrangement is such that when the commutator rotates in one direction, the synchronizing pulses first go to brush 364, then brush 366, then brush 368, etc. When the rotation of the commutator is in the opposite direction, the synchronizing pulses first go to brush 364, then brush 368, then brush 366, the order of the brushes being changed from that of its first described rotation.

Referring to FIG. 12, a fragmentary portion of the commutator 360 is illustrated. The three roller brushes 364, 366 and 368 bear upon the periphery thereof in circumferentially spaced apart relation, the arrangement of brushes and contact segments 362 being such that only one brush can contact a segment at a time. The outgoing pulse lines 370, 372 and 374 from the brushes have been designated "A," "B" and "C" respectively. In the position illustrated in FIG. 12, brush 366 is in contact with a segment on the commutator and synchronizing pulses are being passed through its outgoing line "B." If the commutator is rotated with the shaft 340 in a clockwise direction, brush 366 will break contact with its segment and the next brush to engage a segment will be 368. The pulses will then be sent out over line 374 or "C." Further rotation of the commutator in a clockwise direction will break contact of brush 368 with a segment and bring brush 364 in contact with a segment. The pulses will then be sent over outgoing line 370 or "A." Further rotation in the same direction will bring the "B" brush 366 into contact with a segment. The distribution of the pulses in a clockwise rotation of the commutator will be BCABCAB, etc. On the other hand, if the commutator is rotated counter-clockwise from the position illustrated in FIG. 12, the next brush to engage a segment 362 will be the "A" brush 364. Further rotation in a counter-clockwise direction will next bring the "C" brush 368 into contact with a segment, followed by the "B" brush 366. Thus, the distribution of the pulses in a counter-clockwise rotation of the commutator will be BACBACB, etc.

The three lines 370, 372 and 374 leading from the three commutator roller brushes enter the position-code converter unit 152. The function of the position-code converter is to interpret the pulses received over these lines from the position coder 150 and send them to the proper input terminal of the summing register 140. The position-code converter carries out two operations in its interpretation of the pulses received from the position coder. It deletes all but the first pulse coming from a particular roller brush of the position coder when that brush first makes contact with a given segment of the commutator 360. It then decides whether a pulse from the brush should be added to the summing register or be subtracted therefrom. The position-code converter furnishes "add" or positive response pulses over channel 378 to the summing register and "subtract" or negative response pulses over channel 379 to the summing register.

The summing register 140 has the function of adding or subtracting the command and response pulses and transmits the difference or error signal over channel 380 to the decoder unit 230. The summing register herein described is a reversible binary counter, having the capability of both adding and subtracting. It is similar in operating technique to the binary counter described in the article of Kay Howard Barney entitled, "The Binary Quantizer," Electrical Engineering, November 1949. Positive command pulses (pulses which order the servomotor to move in a positive direction) and response pulses indicating negative motion of the servomotor output are added to the contents of the summing register, while negative command pulses (pulses which order the servomotor to move in a negative direction) and response pulses indicating positive motion of the servomotor output are subtracted from the contents of the summing register. The summing register serves as an error-measuring device for the servo-mechanism with which it is associated and the instantaneous state of the summing register expresses the error in binary form.

FIG. 15 illustrates a block diagram of the circuits of the summing register 140. A series of cascaded electronic flip-flop circuits 382 are arranged in a counter circuit relation between an "add carry" control line 384 and a "subtract carry" control line 386. As previously described in connection with FIG. 11, the summing register receives positive command pulses over line 352 and negative command pulses over line 354, the shift from one input line to the other being determined by the position of the switch 358 under the influence of the sense relay 356. Negative response pulses from the position-code converter 242 are received over line 378, and as shown in FIG. 15 this line is merged with line 354 to form the common input channel 384 of the summing register. Similarly, positive response pulses from the position-code converter are fed over line 379 which merges with line 354 into the common input channel 386 of the summing register. The "add" input line 384 is provided with a gate generator 388 and, similarly, the "subtract" input line 386 is provided with a gate generator 390, the two gate generators being located in their respective lines in advance of the series of flip-flop circuits 382. Each flip-flop circuit is operatively associated with an upper gate circuit 392 and a lower gate circuit 394 connected respectively to the control lines 384 and 386.

In the operation of the summing register 140, each flip-flop 382 generates a pulse on the upper output line 384 (connected to the "1" side of the flip-flop) when its state changes from a "1" to a "0" and it generates a pulse on the lower output line 386 (connected to the "0" side of the flip-flop) when its state changes from a "0" to a "1." The output pulses from the flip-flops 382 are gated by the gate circuits 392 and 394 and the gate generators 388 and 390. Gate generator 388 is activated when a pulse arrives on the upper two input lines 352 and 378, thereby opening the upper row of gate circuits 392 and allowing the counter to add. During this time, the lower gate generator 390 is inoperative and accordingly the lower row of gate circuits 394 is closed. When a pulse arrives on the lower two input lines 354 and 379, the gate generator 390 is activated, the lower row of gate circuits 394 is opened, and the counter is thereby able to subtract. While the counter is set up for subtraction, the gate generator 388 is inoperative and thereby the upper row of gate circuits 392 is closed.

It is now clearly evident that in the functioning of the control system there must not be any coincident pulses on the input lines to the summing register 140, since the register would not operate properly. The occurrence of coincident input pulses is advantageously avoided by the action of the first frequency divider 92 in the clock system, which, as described in connection with FIG. 4, phases potential command pulses and synchronizing pulses, the latter being considered as potential response pulses, properly spaced in time.

In the normal operation of the summing register 140 described herein, the summing register will read binary numbers ranging from 000000 to 111111. The number 100000 is taken as the zero error. All numbers smaller than the zero reference number represent a negative error and all numbers larger than the zero reference number represent a positive error. The pulse-code-to-analog servo-mechanisms of the illustrated embodiment of the invention are so designed that, when operating properly, the number in the summing register will not exceed the above referred to range of numbers. If, through some failure, the error should be larger than the above design limits, a pulse will appear on the output line 396 of the last stage of the flip-flop series. This output line is connected to the checking signal channel 82 extending to the control panel 74 and a pulse appearing in this channel is arranged to stop the machine and give an alarm indication. To illustrate this action, it will be assumed that the summing register contains the number 111111 and a positive command pulse arrives over line 352. Gate generator 388 will then be activated and the counter will add, thereby causing the last stage flip-flop to change from a "1" to a "0." A pulse is thereby generated on the output line 396 and, since gate generator 388 is activated, this pulse will go out over channel 82 and give an alarm indication. A similar action occurs if, after the counter has been reading 000000, a pulse appears on either of the lower input lines 354 or 379.

To insure accuracy of operation, it is desirable to check the action of the summing register and the decoder in each servo-mechanism by duplicating these two units. The outputs of the two decoders in each servo-mechanism can be compared by an amplitude comparison circuit which will send an alarm signal over channel 82 when the outputs of the paired decoders differ by more than the voltage corresponding to the number "1."

The decoder 142 converts the binary numbers held by the summing register 140 into linearly related voltage amplitudes which form the input to the amplifier unit 348 and the servo-motor 344. FIG. 13 illustrates a simplified equivalent circuit of the decoder. The current sources comprise a plurality of triode tubes 400 with large cathode resistors 402. Each tube 400 is connected through channel 380 with one of the flip-flop circuits 382 in the summing register, there being as many tubes in the decoder as there are flip-flop circuits in the summing register. Each tube is either cut off or conducting a fixed amount of current depending upon whether the flip-flop of the summing register with which it is associated contains a "0" or a "1," respectively. This action is symbolized in FIG. 13 by the switches 404 which are closed when the associated flip-flop contains a "1." It is apparent from analysis of FIG. 13 that the first tube of the decoder contributes one unit of voltage to the output lines designated at E, that the second tube contributes two units of voltage, the third tube contributes four units of voltage, etc. The output voltage E of the decoder is then the linear summation of the contributions of one or more tubes 400 and that the number decoded is thereby expressed in the form of a voltage amplitude.

FIG. 16 is a block diagram of the position-code converter 152 and as previously described this unit functions to detect the sequence of the pulse flow from the brushes "A," "B" and "C" of the position decoder 150, and any change in such sequence, and to convey these impulses to the proper input lines of the summing register 140. The position-code converter comprises three electronic flip-flop devices 410 (FF1), 412 (FF2) and 414 (FF3) associated respectively with the three output lines 370, 372 and 374 of the position coder. As indicated in each box outline of the flip-flops in FIG. 16, each flip-flop has either a "1" position or a "0" position.

Six electronic gate circuits are associated with the three flip-flop devices. These gate circuits are identified by the reference characters 416 (GC1), 418 (GC2), 420 (GC3), 422 (GC4), 424 (GC5) and 426 (GC6). The circuitry between the flip-flop devices and the gate circuits is such that upon the arrival of a series of synchronizing pulses from one of the position decoder brushes, only the first of such series of pulses is permitted to go to either input line 378 or 379 of the summing registers, all of the remaining pulses in the series being blocked and thereby unaccounted for by the summing register.

To illustrate the operation of the position-code converter unit, it will be assumed that the last pulse has been received from brush "B" or the position coder and the shaft 340 of the servomotor is turning in the positive direction; i.e., the brushes make contact with the commutator 360 in the sequence ABCABC, et cetera. Since the last pulse received has come from brush "B," the middle flip-flop device 412 is in the "1" position which opens gate circuits 416 (GC1) and 426 (GC6). As will be evident hereinafter, the other flip-flop devices are in their respective "0" positions and all other gate circuits are closed.

Turning movements of the servomotor shaft 340 in the positive direction will next bring brush "C" into contact with a commutator segment. The first of such series of pulses arriving from brush "C" will pass through gate circuit 426 (GC6) and appear as a positive response pulse on outgoing line 378 to the summing register. This first pulse will set flip-flop 412 (FF2) in the "0" position, thereby closing gate circuits 416 (GC1) and 426 (GC6), and set flip-flop 414 (GC3) in the "1" position, thereby opening gate circuits 418 (GC2) and 420 (GC3). Any additional pulses from brush "C" will not appear at the output line 378 since both gate circuits 424 (GC5) and 426 (GC6) are now closed.

Eventually, as the shaft continues to turn in the positive direction there will be a discontinuance of pulses from brush "C" followed by a series of pulses from brush "A." The first of the pulses from brush "A" will pass through gate circuit 418 (GC2) and appear as a positive response pulse in input line 378 to the summing register. This first pulse will also set flip-flop 414 (FF3) in the "0" position, thereby closing gate circuits 418 (GC2) and 420 (GC3), and set flip-flop 410 (FF1) in the "1" position, thereby opening gate circuits 422 (GC4) and 424 (GC5). Additional pulses from brush "A" will not appear on outgoing line 378.

Further turning movement of the shaft 340 will interrupt the flow of synchronizing pulses from brush "A" and cause them to arrive from brush "B." The first of such pulses arriving from brush "B" will pass through gate circuit 422 (GC4) to output line 378. It will also place flip-flop 410 (FF1) in the "0" position and cause gate circuits 422 (GC4) and 424 (GC5) to close, and place flip-flop 412 (FF2) in the "1" position, thereby opening gate circuits 416 (GC1) and 426 (GC6). The sequence of events just described will then be repeated if the shaft continues to rotate in the positive direction. It is to be noted that when the shaft rotates in such direction the first of the series of pulses from any of the brushes pass through the gate tubes or circuits 412 (GC2), 422 (GC4) and 426 (GC6).

When the shaft 340 of the servomotor turns in the opposite or negative direction, the brushes of the position coder make contact with the commutator segments in the sequence ACBACB, et cetera. Although the sequence will differ, the operation of the position code-converter will be like that described for positive directional rotation of the shaft. However, the first of any series of pulses arriving from the brushes will pass through gate circuits 416 (GC1), 420 (GC3) and 424 GC5) and will appear as negative response pulses on input line 379 to the summing register.

It is likely that the brushes of the position coder 150 will distort the shape of the synchronizing pulses. In that event a pulse-shaping network 428 may be inserted in each input line 370, 372 and 374 of the position-code converter.

In addition, it is desirable to provide several gate circuits for checking purposes. Gate circuit 430 (GC7) is electrically connected to the output circuits 378 and 379 and serves to detect any failure in the gate circuits 416, 418, 420, 422, 424 and 426. Gate circuit 430 (GC7) communicates by line 432 with checking channel 398 leading to the control panel 74. Gate circuits 434 (GC8), 436 (GC9) and 438 (GC10) are associated with the flip-flop devices 410, 412 and 414 respectively and function to detect a flip-flop which fails to go to the "1" position. The gate circuits 434, 436 and 438 are connected in series in a line 440 connected at one end to channel 80 to receive synchronizing pulses therefrom and to checking channel 398. In this manner, a failure by any one of the flip-flop devices in the position-code converter will be announced to the controlling circuits of the main control panel 74.

It is evident, as previously pointed out in connection with FIG. 8, that it is desirable to employ at least three possible response or position-indicating pulses on line 80 for every possible command pulse delivered to the second frequency divider 94. Moreover, it is also evident that for the type of circuit illustrated herein for comparing the command and response pulses, specifically the summing register 140, the response pulses should not be coincident in time with the command pulses. This condition is attained in a satisfactory manner by dividing a stream of pulses issuing from a single source, although it is obvious that separate sources of pulses not coincident in time may be used in lieu of the single source.

Whatever maximum feed rates are selected for the controlled parts of the machine, it is evident that since the first frequency divider 92 divides the clock frequency by four and supplies only one potential command pulse for every three response or synchronizing pulses, the clock frequency should be set sufficient to achieve the maximum feed rates. If in the illustrated embodiment of the invention, the maximum speed of the machine is approximately fifteen inches per minute, this will require a nominal maximum of 512 pulses per second for the input of the second frequency divider 94. Accordingly, the clock frequency should be set for at least 2048 pulses per second to provide both the potential command and potential response pulses. If additional response or synchronizing pulses are desired, a third flip-flop may be added to frequency divider 92 and be triggered by the carry pulses from the second flip-flop 167. This will provide seven synchronizing pulses for every possible command pulse. In such cases when three flip-flops are employed in the first frequency divider, the nominal clock frequency should be 4096 pulses per second.

The duration of the clock cycle may be adjusted to the length of cut or other straight line movement desired in one machine cycle. If the maximum speed of the machine should be approximately fifteen inches per minute, the machine part under control will take approximately 3.2 minutes to travel a length of 48 inches. At the minimum clock cycle of two seconds, this operation will require 96 cycles, with a ten digit command number for each cycle. This arrangement is undesirable when the machine part under control moves in a straight line, such as making a straight long cut. It would require a large amount of punched tape instruction to perform a single operation. This difficulty is overcome by providing a choice of a plurality of fixed clock cycles. These may range from 2 seconds to 256 seconds in duration at the nominal clock oscillator rate. Thus, the control system may operate with a cycle time long enough to do one straight line cut of lengths up to 64 inches and from a single block of data on the tape. For shorter cuts, it may operate with a selected cycle time so that the cut need not consume 256 seconds per cut. In addition, in manual control the operator may set the cycle time to infinity so that the pulse distributor will run continuously. In the latter setting, the manual data converters provide a wide choice of feed-rates without the provision for automatically stopping at a predetermined point.

The clock cycle control 98 routes the potential command pulses arriving at frequency divider 94 to any one of the first eight stages thereof. For the infinity setting, the clock cycle control causes the pulses to enter the first stage. If the clock cycle is set for 32 seconds, it directs the pulses into the fourth stage. If the clock cycle control is set for 2 seconds, the pulses enter the eighth stage. The block length on the tape is determined by the cycle time. The clock cycle time order may be placed across the tape in one line at the beginning of each block. This may be followed by the directional command to each machine part whether in a positive or negative direction. Each block of information on the tape may therefore consist of from twelve to nineteen lines of tape, depending on the cycle time. The following table illustrates the relation between cycle time, the stages of frequency divider 94 and the block lengths on the tape:

| Time, seconds | Entering Stage of Sec. Frequency Divider | Block Length, lines | Cycle of Time Order on Tape |
| --- | --- | --- | --- |
| 2 | 8 | 12 | 000 |
| 4 | 7 | 13 | 001 |
| 8 | 6 | 14 | 010 |
| 16 | 5 | 15 | 011 |
| 32 | 4 | 16 | 100 |
| 64 | 3 | 17 | 101 |
| 128 | 2 | 18 | 110 |
| 256 | 1 | 19 | 111 |

The clock cycle may be manually or automatically controlled. For manual control a rotary switch operated by a knurled wheel may be provided. The switch will shift pulses coming from the start-stop circuit 96 to any one of the first eight stages of the second frequency divider. For automatic control, two sets of three relays may be provided whose contacts perform the same function as the manual rotary switch. One set of relays is used with the "A" register of the data converters, the other is used with the "B" register. The relays are controlled by the cycle time provided in the tape as indicated in the right column of the immediately preceding table. The relays shift the contacts to the selected stage of the second frequency divider. This is shown schematically in FIG. 6 by the full and dotted outline positions of channel 114 over which the potential command pulses are fed.

Control and Checking Circuits

Operational checking is provided in the control system in order to detect the presence of malfunction and to halt the work being performed in such a manner as to prevent damage to the workpiece. There has been some reference hereinabove to checking circuits, such as the excessive error arising out of the summing register 140 and the checking circuits provided in the position-code converter 152. An important checking circuit in the system is the schematic illustration in FIG. 14 for checking the two frequency dividers 92 and 94.

The divider checking circuit of FIG. 14 provides an alarm signal when frequency divider 94 or the second stage of frequency divider 92 fails. When the machine is operating, the start-stop circuit 96 passes the carry-pulses of the second stage of the first frequency divider 92 through the clock cycle control to the input of the second frequency divider 94. With reference to FIG. 9, it is seen that in a chain of flip-flops connected as a binary frequency divider, for every non-carry pulse from the first stage, there is a non-carry pulse from one of the other flip-flops or a carry pulse from the last stage of the divider. Assuming no delay in the operation of the divider, these pulses are spaced apart by the pulse period of the check oscillator. The operation of the divider check circuit 100 makes use of the fact that when all of the flip-flops of the two frequency dividers are operating properly, for every non-carry pulse from the first stage of the first frequency divider there must be a non-carry pulse from the second stage thereof, a non-carry pulse from one of the flip-flops in the second frequency divider, or a carry pulse from the last stage of the second frequency divider. When this condition does not hold, the divider checking circuit 100 provides an alarm signal.

Referring to FIG. 14, input line 440 to the divider checking circuit receives non-carry pulses from the second stage of the first frequency divider, non-carry pulses from all stages of the second frequency divider, and carry pulses from the last stage of the second frequency divider. The pulses thus received by line 440 form input "1." Input line 442 receives the non-carry pulses from the first stage of the first frequency divider 92. These pulses form input "0." If the two frequency dividers 92 and 94 operate properly, the pulses arriving on lines 440 and 442 will alternate in time. A pulse arriving on input 440 will find electronic gate circuit 444 closed and will, after a short delay, set the flip-flop 446 to the "1" position. This will be followed by a pulse on input 442. This pulse will find gate circuit 448 closed and, after a short delay, will set the flip-flop 446 to the "0" state. This sequence will continue to repeat so long as the frequency dividers are operating properly.

If, however, a pulse on either input 440 or 442 is missing, the next pulse on the other input will find an open gate circuit and will send out an alarm over channel 450 to the panel 74 and also an alarm disabling signal over channel 120 to the start-stop circuit 96. Gate circuit 452 is provided to prevent an alarm indication when the machine is stopped. When the machine is stopped frequency divider 94 is inoperative. Without gate circuit 452, the divider checking circuit would give an alarm indication. By connecting gate circuit 452 to the flip-flop of the start-stop circuit by channel 120, an alarm indication is inhibited during the period when the machine is stopped.

The divider checking circuit consists of a standard flip-flop 446, three gate circuits 333, 338 and 452, and two delay circuits identified at 454 and 456. The delay circuits may provide a delay between 15 and 25 microseconds and will be either monostable multivibrators or phantastron delay circuits.

The control panel 74 includes a component referred to as a control circuit unit 460 which is connected by various channels to the separate components of the system as illustrated in FIG. 4. The primary function of the control circuit unit 460 is to stop the transmission of data to the servo-mechanisms with a minimum loss of information in the event of a malfunction alarm or stop signal from anywhere in the system. The secondary functions of the control circuit unit 460 are to identify the sources of malfunction alarms, restart the data transmission after a malfunction has been cleared, synchronize the tape feed with the machine operation so that new data are available as needed, and perform the necessary electrical switching in order that the controlled machine will run on manual or automatic data as desired.

To provide manual supervision of the control system in general, the control circuit unit is provided with the start and stop control handle 58 previously described in connection with FIG. 1 to initiate the operation of the director or to stop the same. In lieu of a single handle movable to two positions for accomplishing this overall control, two separate push buttons may be employed, one to start and the other to stop the operation of the director. This control functions over channel 110 leading to the start-stop circuit 96 of the clock system in the manner previously described. The control circuit unit 460 is also provided with manually actuated means for selecting either the manual or the automatic data supply systems. This control means is indicated at 462 and may consist of separate push buttons, one for switching the director so that the machine will run on manually introduced data and the other for switching the director for automatically fed data such as the punched tape.

The control circiut unit 460 also includes a set of pilot lights to signal the origin of any malfunction alarm, audible annunciators to signal certain selected malfunctions, and a manually actuated element in the form of a button to collar all alarm signals. The proper operation of the command-data circuits, whether in the manual or automatic data supply systems 48 and 44, depends upon the proper sequence of events in frequency divider 94 over one complete clock cycle. If a malfunction occurs in some part of the machine other than the frequency divider 94, it is desirable in many situations of malfunctioning to hold the divider in its present state until the malfunction is cleared, then proceed from the point at which the system stopped. In order to avoid loss of information during the period the director is stopped while any malfunction is being investigated and corrected, it is expedient to synchronize any stop signals with the time intervals between command or control-register pulses. For these reasons it is highly desirable to use the synchronizing pulses separated by the first frequency divider 92 in the clock system as the pulses for the stop and start signals. These synchronizing pulses are sent over channel 80 as previously described and never coincide in time with the potential command pulses transmitted to frequency divider 94. The portions of the circuits in the control unit 460 which govern the start-stop circuit 96 utilize these synchronizing pulses and for the transmission of the pulses to the control unit a branch channel 464 connected to channel 80 is provided.

The start-stop circuit portion of the central control unit 460 is connected by separate alarm channels to several different components of the system for checking this operation and for indicating to the operator any malfunction thereof. Channels 466, 468 and 470 respectively connect the control circuit unit with the divider checking circuit 100 in the clock system, the registers "A" and "B" in the command data converter unit 124, and the data distributor unit 122. The control circuit unit 460 is also connected by alarm channels to the pulse-code-to-analog servo-mechanisms and the servomotors associated therewith as generally explained in connection with FIG. 5. For this purpose, the channel 82 is provided for containing a multiplicity of alarm and checking circuits running to the servomechanisms and the servomotors. The start-stop portion of the circuit control unit 460 contains a series of relays and gas tubes which, in response to any alarm signals over these checking channels, are arranged to pass the next synchronizing pulse as a stop signal to the start-stop circuit 96 in the clock system over channel 110. The relays and gas tube circuits associated with the various checking signals are designed to lock up and to operate a series of pilot lights to identify the source of alarm. The alarm circuits which signal malfunctions that inherently interfere with the ability of the machine to stop without damaging the work also initiate a "retract" signal over the channel 88 previously described in connection with FIGS. 4 and 5. The retract signal is transmitted over channel 88 to the servo-mechanism controlling the "Y" axis of the machine and overrides any existing command in the system and causes the tool 25 to rise clear of the work at its maximum rate. Certain of the alarm signals may also operate one or more annunciators. The control circuit unit may be so designed to require the operator, after any alarm signal, to push an "alarm clear" button 472 in order to release the relays and reset the gas tube circuits before operating the control 58 to "start" position. The circuit control unit may be also designed to require the operator to rezero the machine following the retraction of the tool by a signal over channel 88.

The manual automatic selector 462 of the control circuit unit 460 also includes a transfer switch for routing the end carry or transfer pulse carried over channel 474 from frequency divider 94 either to the stop inside of the start-stop circuit 99 over channel 476 in the manual operation of the system or over channel 478 to the data distributor 122 in the automatic operation of the system. In manual operation, the transfer pulse delivered to the start-stop circuit 96 functions to stop the flow of pulses through channel 114 to the frequency divider 94 after the completion of the command signal placed into the system by the switches 62, and continues to withhold the delivery of the pulses until the next manual command is set by the switches 62. In automatic operation, the transfer pulse delivered to the data distributor signifies the completion of a clock cycle and as previously described is utilized to switch from one bank of relay storage registers, such as "A," to the other bank of relay storage regitsers, such as "B." The operation of the transfer switch is synchronized by the transfer pulses so that regardless of when the transfer switch is operated, the machine completes its present cycle, stops, and transfers its control from manual to automatic or vice versa in that order. If the transfer switch of the manual-automatic selector 462 is thrown with the machine stopped, the transfer occurs immediately. If the transfer switch is thrown to "automatic" when the machine is on its infinite cycle setting as in "manual" operation, the machine should be stopped manually or by a limit stop in order to complete its transfer.

*Computation and Tape Preparation*

FIGS. 18, 19 and 20, together with FIG. 17, illustrate one manner of preparing the tape for a typical cutting operation on an airfoil panel. Since the center of the cutting tool will assume positions different from the point or surface of cutter contact with the workpiece, calculations are made to transform the coordinates of the surface to be shaped or machined into the coordinates for the cutter center. The desired cutting paths and feed speeds for the particular machine operation may be determined from drawings and specifications of the workpiece to be produced.

The problem is typified in FIGS. 18, 19 and 20 where the dimensional characteristics of an airfoil panel 480 are laid out. FIG. 18 outlines a section through the airfoil panel in which "t" is the maximum thickness in percent of chord, "c" is the chord length and "p" is a station along the chord in fraction of the chord. In FIG. 19 the panel section is shown laid out with respect to the coordinates "X," "Y" and "Z," which represent the three directions of motion of the machine. The path or locus of the cutter center is shown dotted at 482 for a particular cut at a station along the chord of the panel. In this example of the use of the control system all cuts of the machine are made along straight lines whose chord-wise distance from the leading edge remains a fixed percentage of the chord length. FIG. 20 illustrates the correction added to each coordinate to account for the non-coincidence of the cutter's center with the work engaging surface thereof. The numbers appearing in FIGS. 19 and 20 represent dimensions in inches.

The locus of the tool center is divided into a series of straight-line segments which in the example of FIGS. 18 to 20 are slightly diverging to one another but which in other operations may lie in any direction. The dimensions of each straight-line segment are resolved into components parallel to the three axes of the machine. A suitable clock cycle time is chosen for producing the desired feed rate for each straight-line segment. The three components of each straight-line segment and the clock cycle time selected therefor are tabulated in a predetermined order to form a single set or "block" of control instructions for the machine. All of the segments are similarly tabulated and arranged in the order in which they will be used by the machine.

The tabulated coordinates are converted to arithmetic binary form or notation. This binary version of each set of instructions to the machine are then stored or recorded on tape in the order in which they are used to control the machine to perform the desired work. As previously described the recording medium or tape may be of various kinds. It is herein shown as punched or perforated paper tape wherein a punched hole may represent the "on" or "1" of the binary notation and the lack or absence of a hole represents the "off" or "0" of such notation. FIG. 17 illustrates a section of punched paper tape containing the stored "record" of two adjacent blocks of instruction to the machine. The instruction blocks are set off from one another in FIG. 17 and each is enclosed within a rectangularly shaped dotted outline.

The command orders to the "X," "Y" and "Z" axes of the machine are arranged on the tape 260 in longitudinally extending columns which may be arranged all on one side of the sprocket drive holes 285 as shown in the example of FIG. 17. The checking columns may be located on the opposite side of the sprocket holes. As previously described the first transverse row of holes of the "X," "Y" and "Z" columns of the instruction block may furnish a general machine order, such as the clock cycle time. The second transverse row of holes of each block may be used to indicate the direction of movement of each machine part along its respective axis, such as whether to move in a positive or negative direction. The remaining portions of each of "X," "Y" and "Z" columns of the tape function to record in binary notation the desired travel or distance of movement of the machine parts along their respective axes. If the machine incorporated additional axes to be controlled and the control system contained additional servo-mechanisms for controlling such axes, it is obvious that additional information columns could be added to the tape.

In the illustrated embodiment of the invention, each instruction block on the tape may consist of from twelve to nineteen transverse lines of tape depending on the cycle time selected. If a maximum cycle time is selected then each block will consist of nineteen lines or transverse rows of holes which is the situation illustrated in FIG. 17. A shorter time cycle will reduce the number of tape lines and the overall length of the instruction block. Deleting two transfer lines at the beginning of each block for general instructions as previously explained, each axis column may contain anywhere from twelve to seventeen points to designate the desired distance of travel of the machine part controlled thereby. Each such point on the tape may be punched to represent the "1" of binary notation or left untouched to represent the "0" of binary notation. The blocks of instruction need not be separated from one another as much as shown in FIG. 17 where the definite clearance between the blocks is employed for purpose of clarity to show the block characteristic of each instruction.

Having thus described the invention, we claim:

1. In a system for controlling the extent of movement of a part, means for feeding instruction data into the system including records each having a plurality of spaced points thereon representing in numerical form a desired movement of the part from one position to the next, means for sensing said points on the records and for converting the points on each record into a group of electrical pulses quantitatively representing the desired distance for moving the part from the previous position to the new position, means for moving the part, and means responsive to each group of pulses for controlling said last means and for causing the same to move the part to each new position.

2. In a system for controlling the extent of movement of a part, means for feeding instruction data into the system including records each having a plurality of spaced points thereon representing a different position of the part, means for generating a train of electrical pulses spaced in time and each representing the same increment of distance of movement of the part, pulse controlled means for moving the part and operable to move the same a distance proportional to the number of pulses by which the means is controlled, and means for sensing said points on each record and responsive to at least certain pulses in said pulse train for producing a number of pulses sufficient to cause the part to be moved to the positions set forth on the records.

3. A system for controlling the extent of movement of a part comprising, in combination, input data mechanism including means for sensing successive records each containing an instruction for moving the part from one position to another position, a source of electrical pulses adapted to deliver a continuous stream of pulses spaced in time, means for dividing the stream of pulses into separate channels each carrying a lesser number of pulses by a definite ratio, means receptive to pulses for controlling the movement of the part and operable to move the part distances proportional to the number of pulses received, and means operatively associated with the channels of said pulse stream dividing means and responsive to said record sensing means for producing a number of pulses corresponding proportionally to the distance the part is instructed to move and for delivering said produced pulses to said part moving means.

4. A control system for controlling the extent of movement of a part, comprising means for feeding input data into the system indicating the distances for moving the part from one position to another position, means for converting the input data into electrical pulses representing the distances between successive positions of the part, means for converting the resulting movement of the part into electrical pulses, and means for comparing the pulses converted from the input data with the pulses converted from the resultant movement of the part and for employing any difference between such pulses for moving the part.

5. In a control system for a movable part, means for generating a train of pulses each representative of a unit of distance, means for dividing said pulse train into two separate series of pulses, means utilizing pulses in one of said pulse series as command pulses for causing the part to be moved, and means utilizing pulses in the other pulse series as response pulses for indicating the resultant movement of the part.

6. In a control system for moving controlled parts along two or more axes, means for generating a train of electrical pulses each representative of a unit of distance, an instruction record signifying in said units the desired distance for moving the parts along their respective axes, a separate means operatively associated with each part for moving the same along its axis, said moving means for each part being receptive to electrical pulses and operable to move the part a distance proportional to the number of pulses received thereby, means for reading said record to determine the distance each part is to be moved along its axis, means operatively associated with said reading means and with the moving means for each of the parts and responsive to at least certain of the pulses in said pulse train for producing a quantity of electrical pulses sufficient to move the respective parts the desired distance signified on the instruction record and for delivering said produced pulses to the respective part moving means.

7. A control system for moving controlled parts along two or more axes, said system comprising means for feeding successive instructions each signifying the desired distances for moving said parts along their respective axes at the same time, a source of electrical pulse energy, separate means operatively connected to said parts for moving the same along their respective axes, each of said last means being receptive to electrical pulses and operable to move its respective part a distance proportional to the number of pulses received thereby, means responsive to at least certain pulses from said pulse source for simultaneously supplying a variable number of electrical pulses to each part moving means, and means for sensing each instruction thus fed to determine the distances for moving the parts and controlling said pulse supply means to simultaneously furnish the number of pulses to each part moving means sufficient to move the parts the desired distances.

8. In a system for controlling the movement of an object along a prescribed path, said system comprising means for developing a train of pulses each representative of a unit distance, pulse receptive means for moving the object and operable to move the object a distance proportional to the number of pulses received thereby, pulse delivery means connecting said pulse receptive means with said pulse generating means, and control means for varying the number of pulses flowing to said pulse receptive means over said pulse delivery means.

9. In a control system for moving an element along a prescribed path, means for generating a train of electrical pulses each representative of a unit of distance, means for successively advancing records setting forth in code form the distance for moving the element from station to station along said path, means receptive to electrical pulses and operable to move the element a distance equivalent to the sum of pulses received thereby, means responsive to at least certain of the pulses in said pulse train for producing variable quantities of pulses and delivering the same to said element moving means, means for sensing said records successively as they are advanced and for determining the distances set forth in code form thereon, and means operatively associated with said sensing means and with said pulse producing means and operable to control said pulse producing means so that said pulse producing means delivers to said element moving means a quantity of pulses equivalent to the distance sensed on each of said records.

10. A control system including, in combination, a source of pulse energy adapted to deliver a stream of pulses, means for dividing the stream of pulses into a plurality of separate channels each carrying a lesser number of pulses by a definite ratio, means connected to the output of said channels and receptive to the number of pulses received therefrom for varying an operation procedure in proportion to the number of pulses received thereby, and means controlling said channels and rendering one or more of the channels inoperative to carry pulses in order to vary the number of pulses delivered to said operation varying means.

11. In a system for controlling the movement of a member along a given path, means for continuously sensing the direction and extent of movement of the member comprising a commutator operatively associated with said member and rotatable proportional to the extent of movement of the member and either in one direction or the other direction depending upon the direction of movement of the member along the path, a source of electrical pulse energy communicating with the commutator and delivering pulses thereto, a plurality of pulse receiving elements bearing on the commutator, said elements being so arranged that only one of the elements is capable of receiving pulses from the commutator at a time and further so arranged that the order in which the elements receive pulses from the commutator changes when the member reverses its direction of movement along the path.

12. In a system for controlling the movement of an object along a prescribed path, means for generating a stream of pulses spaced in time and each representative of a unit of distance, pulse receptive means for moving the object and operable to move the object a distance proportional to the number of pulses received thereby and at a speed proportional to the rate of pulse reception, pulse delivery means connecting said pulse receptive means with said pulse generating means, control means operable on said pulse delivery means to vary the number of pulses received by said pulse receptive means, and further control means operable on said pulse generator for varying the frequency of the pulses generated thereby.

13. The method of controlling the movement of an element along a prescribed course which comprises generating a stream of pulses substantially uniformly spaced apart in time, diverting out of the pulse stream successive groups of pulses, moving the element distances along the course in direct proportion to the number of pulses in each diverted pulse group, altering the frequency at which the pulses are generated, and varying the rate at which the element is moved along the course in direct proportion to the frequency of generation of the pulses.

14. In a system for controlling the extent of movement of a part, an elongated medium divided longitudinally into separate instructions for moving the part, means for sensing and storing one instruction on the medium, means for moving the part in accordance with said one stored instruction, means for advancing said medium while the part is being moved by said part moving means in accordance with said one instruction, and means for sensing and storing a second instruction on the medium while the part is being moved by said part moving means in accordance with said one instruction.

15. In a system for controlling the extent of movement of a part, means for moving the part in accordance with positional data fed into the system and for continuously comparing the resultant movement of the part to the data fed into the system, said means including means for generating electrical pulses each potentially representing an increment of distance of movement of the part, means responsive to at least certain of said generated pulses for converting the data fed into the system into a group of pulses quantitatively representing the desired distance for moving the part, means responsive to each of said groups of data converted pulses for moving the part distances corresponding to the quantity of pulses thus converted, said last named means including means for converting the extent of movement of said part into a group of pulses quantitatively representing the distance moved by the part and means for comparing the quantity of pulses representing the distance moved by the part with the quantity of pulses in said data converted group of pulses.

16. In a control system utilizing pulses for controlling the extent of movement of a member, means for producing a stream of pulses, a chain of bi-stable devices, means for supplying said stream of pulses to one of the bi-stable devices in said chain, pulse receptive means for moving the member and operable to move the member a distance related to the number of pulses received thereby, means for deriving from said chain pulse trains having different pulse repetition rates and for supplying said pulse trains to said pulse receptive means, and means for selectively connecting said stream of pulses to different bi-stable devices in said chain, thereby to vary the cycle duration of said chain.

17. In a control system utilizing pulses for controlling the extent of movement of a member, means for developing a stream of pulses, a plurality of pulse carrying channels, a chain of bi-stable devices, means for supplying said stream of pulses to the input of said chain, means for deriving from said chain pulse trains having different pulse repetition rates and for supplying said pulse trains to said channels, means connected to the output of said channels and receptive to the number of pulses received therefrom for varying the extent of movement of the member in accordance with the number of pulses received thereby, and means for controlling said channels and rendering one or more of the channels inoperative to carry pulses in order to vary the number of pulses delivered to said member moving means.

18. In a control system utilizing pulses for controlling the extent of movement of a member, means for developing a plurality of pulse trains having different pulse repetition rates, pulse receptive means for moving the member and operable to move the member a distance proportional to the number of pulses received thereby, and control means for supplying selected ones of said pulse trains to said pulse receptive means.

19. In a control system utilizing pulses for controlling the extent of movement of a member, means for feeding input data into the system indicating the distances for moving the member from one position to another position, means for developing a plurality of pulse trains, the pulses in each of said trains being non-coincident with the pulses in other trains, pulse receptive means for moving the member and operable to move the member a distance related to the number of pulses received thereby, and control means responsive to input data fed into the system for supplying selected ones of said pulse trains to said pulse receptive means.

20. In a control system utilizing pulses for controlling the extent of movement of a member, means for sensing successive records each containing an instruction for moving the member from one position to another position, means for developing a stream of pulses, a chain of pulses counter devices, means for supplying said stream of pulses to said chain to advance the same, each of said counter devices developing carry pulses and noncarry pulses in response to advancement of said chain, pulse receptive means for moving the member and operable to move the member a distance related to the number of pulses received thereby, and means responsive to said record sensing means for selecting noncarry pulses from said pulse counter devices of a quantity equivalent to the distance the member is instructed to move and for supplying said selected noncarry pulses to said pulse receptive means.

21. In a control system utilizing pulses for controlling the extent of movement of a member, means for signifying the number of pulses to be utilized comprising an elongated tape-like medium divided longitudinally into separate instructions for moving the member, each instruction of said medium signifying in numerical form the desired distance for moving the member, means for sensing each instruction and for storing in numerical form the sensed instruction, means for developing a plurality of pulse trains, the pulses in each of said trains being non-coincident with the pulses in other trains, pulse receptive means for moving the member and operable to move the member a distance related to the number of pulses received thereby, means for selecting those pulse trains which collectively comprise a quantity of pulses equivalent to the stored numerical instruction, and means for supplying said selected pulse trains to said pulse receptive means.

22. In a control system utilizing pulses for controlling the extent of movement of a member, means for signifying the number of pulses to be utilized comprising an elongated tape-like medium divided longitudinally into separate instructions for moving the member, each instruction of said medium signifying in numerical notation the desired distance for moving the member, register means, means for sensing each instruction, means for storing the sensed instruction in said register means, means for developing a plurality of pulse trains having different pulse repetition rates, pulse receptive means for moving the member and operable to move the member a distance related to the number of pulses received thereby, means responsive to said register means for selecting those ones of said pulse trains which are collectively equivalent to the instruction stored in said register means, and means for supplying said selected pulse trains to said pulse receptive means.

23. In a control system utilizing pulses for controlling the extent of movement of a member, means for signifying the number of pulses to be utilized comprising an elongated tape-like medium divided longitudinally into separate instructions for moving the member, each instruction of said medium signifying in numerical form the desired distance for moving the member, means for converting each instruction into a train of pulses spaced in time and representative of the distance signified for moving the member, means for developing feedback pulses proportional in number to the distance moved by the member, reversible binary counter means, and means including said reversible binary counter means and jointly responsive to said train of pulses and said feedback pulses for moving the member at a rate corresponding to the pulse rate of said train of pulses.

24. In a control system utilizing pulses for controlling the direction and extent of movement of a member along a given path, an elongated record medium divided longitudinally into separate blocks of instructions each signifying the desired direction and distance for moving the member, means for successively reading the instruction blocks of the medium, means cooperating with said reading means for converting each distance instruction into a group of electrical pulses quantitatively representing the distance the member is instructed to move, pulse receptive means having a first mode of operation in which the member is moved in one direction along said path and having a second mode of operation in which the member is moved in the opposite direction along said path, said pulse receptive means being operable to move the member in either direction a distance related to the number of pulses received thereby, means for supplying said group of pulses to said pulse receptive means, and means cooperating with said reading means for selectively causing said pulse receptive means to assume said first mode of operation or said second mode of operation in accordance with the direction instruction read.

25. In a control system utilizing pulses for controlling the movement of a member, means for intermittently feeding input data into the system indicating the distances for moving the member to successive positions, means for converting the intermittently fed input data into a substantially continuous series of pulse trains, the number of pulses in said trains representing the distances between successive positions of the member, and means responsive to said series of pulse trains for substantially continuously moving the member to successive positions.

26. In a control system utilizing pulses for controlling the movement of a member, an elongated record medium divided longitudinally into separate instructions signifying the distances for moving the member to successive positions, means for intermittently advancing the record medium in the direction of its length, means for successively reading the instructions on the record medium, means cooperating with said reading means for converting successively read instructions into a substantially continuous series of electrical pulse trains, the number of pulses in said trains representing the distances between successive positions of the member, and means responsive to said series of pulse trains for substantially continuously moving the member to successive positions.

27. In a control system utilizing pulses for controlling the extent of displacement of a member, the combination of an elongated record medium divided longitudinally into separate blocks of instruction each signifying in binary notation the desired distance for displacing a member, means for advancing the record medium in one direction of its length, means for successively reading the instruction blocks as the medium is moved thereby and for stopping the advancement of the medium at the conclusion of the reading of each instruction block, means cooperating with said reading means for converting the binary notation of each block of instructions into a train of pulses representative of the distance signified for displacing the member, means for utilizing each of such trains of pulses for displacing a member, and means responsive to termination of each train of pulses for initiating the advance of the record medium to bring the next successive block of instructions into position to be read.

28. In a control system utilizing pulses for controlling the simultaneous movement of a plurality of members along predetermined paths, means for developing a plurality of pulse trains having binary related pulse repetition rates, pulse receptive means for moving each member along its predetermined path and operable to move the member a distance proportional to the number of pulses received thereby, and control means for substantially simultaneously supplying selected ones of said pulse trains to each pulse receptive means associated with said members.

29. In a quantizer wherein each predetermined movement of a movable member produces first and second consecutively appearing signals on first and second conductors, respectively, a device responsive to the consecutive appearance of the first and second signals on the first and second conductors, respectively, for producing an output signal, said device comprising: electronic switching means normally in one conduction state but responsive to the first signal appearing on the first conductor for switching into its other conduction state; and means responsive to the appearance of the second signal on said second conductor when said switching means is in said other conduction state for simultaneously producing an output signal and switching said switching means into its normal conduction state.

30. In a quantizer wherein each predetermined movement of a movable member produces first and second consecutively appearing signals on first and second conductors, respectively, a device responsive to the consecutive appearance of the first and second signals on the first and second conductors for producing an output signal, said device comprising: flip-flop means responsive to signals appearing on said first conductor for triggering into one conduction state; means responsive to the appearance of a signal on said second conductor and said one conduction state of said flip-flop means for producing an output signal; and means responsive to the appearance of a signal on said second conductor and said one conduction state of said flip-flop means for triggering said flip-flop means into its other conduction state.

31. A device for quantizing the rotation of a shaft, said shaft being rotatable in one direction, said device comprising: means, having first and second output terminals and responsive to a predetermined angular rotation of the shaft, for producing consecutive first and second signals at said first and second output terminals, respectively, said means initiating said second signal after the completion of said first signal; and means responsive to each consecutive appearance of said first and second signals at said first and second output terminals, respectively, for producing an output signal.

32. A device for quantizing the movement of a movable element, said device comprising: means responsive to each predetermined movement of the movable element for producing a pair of sequentially appearing first and second signals, said second signal appearing after the completion of said first signal; and means responsive to each sequential appearance of said pair of signals for producing an output signal.

33. A device for quantizing the rotation of a shaft rotatable in two directions, said device comprising: means having 1st, 2nd and 3rd output terminals and responsive to a predetermined amount of angular rotation of the shaft in one direction for producing consecutive signals on said 2nd, 1st and 3rd terminals and responsive to a predetermined amount of angular rotation of the shaft in the other direction for producing consecutive signals on said 2nd, 3rd and 1st output terminals; first means responsive to the appearance of consecutive signals on said 2nd, 1st and 3rd output terminals for producing an output signal representing a count up; and second means responsive to consecutive signals appearing on said 2nd, 3rd and 1st terminals for producing an output signal representing a count down.

34. A device for quantizing the movement of a movable element, said element being movable in two directions, said device comprising: means responsive to each predetermined amount of movement of the movable element in one direction for producing a first series of at least three output signals and responsive to each predetermined amount of movement of the movable element in the other direction for producing a second series of at least three output signals; and means responsive to each appearance of said first and second series of signals for producing first and second output signals, respectively.

35. A device for quantizing the movement of a movable element having movement in at least first and second directions, said device comprising: sensing means having a plurality of output terminals and responsive to predetermined amounts of movement of the movable element in said first and second directions for producing signals in first and second sequences on said plurality of output terminals, the signal appearing on any output terminal for either of said first or second sequences being one or more consecutive electrical impulses; and quantizing means electrically coupled to the plurality of output terminals of said sensing means and responsive to said first and second signal sequences for producing first and second output signals, respectively.

36. A device for quantizing the movement of a shaft rotatable in two directions, comprising a commutator operatively associated with said shaft, a source of electrical energy connected to said commutator, a plurality of energy receiving elements bearing on said commutator, said elements being so arranged that only one of the elements is capable of receiving electrical energy from said commutator at a time and further so arranged that the sequence in which the elements receive energy from the commutator changes when the direction of rotation of the shaft is reversed, and quantizing means connected to said energy receiving elements and responsive to the sequence in which energy is received thereby for producing first and second output signals.

37. A system for controlling the relative motion of a tool and a workpiece to effectuate a desired operation on said workpiece comprising a source of periodic pulses, first means to move said workpiece relative to said cutting tool along a first co-ordinate a predetermined increment responsive to a pulse, second means to move said workpiece relative to said cutting tool along a second co-ordinate a predetermined increment responsive to a pulse, first means to derive from said source of periodic pulses a first plurality of pulses, the total number of pulses in said first plurality being representative of the total number of increments of motion along said first co-ordinate to effectuate said desired operation, second means to derive from said source of periodic pulses a second plurality of pulses, the total number of pulses in said second plurality being representative of the total number of increments of motion along said second co-ordinate to effectuate said desired operation, and means to simultaneously apply said first and second plurality of pulses to said first and second means to move said workpiece relative to said tool.

38. In a system for controlling with pulse signals the relative incremental motion along separate co-ordinates of a tool and workpiece to effectuate a desired operation along a desired resultant path on said workpiece, a single pulse source, means to derive a train of said pulses for each of said separate coordinates from said single-pulse source, means to determine the total number of pulses required in each train to complete said desired operation along said desired path, and means to control the frequency of said single-pulse source to vary the frequencies of the pulses in said pulse train relative to one another at predetermined portions of said pulse trains to determine the speed of the relative tool and workpiece in motion.

39. In a system for controlling with pulse signals the relative incremental motion along separate co-ordinates of a tool and workpiece to effectuate a desired operation on said workpiece, comprising an error register to which control pulses are applied to be counted, means to convert the count of said error register to a voltage having a representative amplitude, means to move said workpiece relative to said tool responsive to said representative voltage, motion transducer means to convert increments of said relative motion to error pulses, and means to apply said error pulses to said error register to be subtracted from the count of said control pulses.

40. A system for providing motion increments in response to control pulses, comprising an error register to which said control pulses are applied to be counted, digital-to-analog means to convert the count of said error register to a voltage having a representative amplitude and polarity, servomotor means to which said voltage is applied, means driven by said servomotor means, motion transducer means to convert increments of motion of said means driven by said servomotor to error pulses, means to apply said error pulses to said error register to be substracted from the count of said control pulses, and means to prevent the simultaneous application of a control pulse and an error pulse to said error register.

41. A system for controlling the movement of a first member relative to a second member with respect to first and second reference paths simultaneously in accordance with numerical data including first and second numbers, said system including circuitry for establishing electrical representations for the first and second numbers, and means for receiving the electrical representations and for moving the first member relative to the second member with respect to the first and second reference paths through distances corresponding to the first and second numbers, respectively, and at rates with respect to the first and second reference paths bearing the same ratio to each other as do the first and second numbers.

42. A system for controlling the movement of a first member relative to a second member with respect to first and second noncoincident axes simultaneously in accordance with numerical data in recorded form, said numerical data including first and second numbers, said system including means for establishing first and second electrical representations for the first and second numbers, respectively, means for receiving the first and second electrical representations and for producing first and second electrical signals corresponding to the first and second electrical representations, respectively, each signal having a first property which is a function of its corresponding electrical representation and a second property which bears the same ratio to the second property of the other signal as do their corresponding electrical representations, and first and second means for receiving the first and second signals, respectively, and for moving the first and second members through distances determined by the first properties and at rates determined by the second properties.

43. A system for controlling the movement of a first member relative to a second member through a path with respect to first and second noncoincident axes simultaneously in accordance with numerical data in recorded form, said numerical data including first and second numbers, said system including electrical circuitry for receiving the first and second numbers and for utilizing them to produce first and second trains of pulses, respectively, the ratio between the rates of pulse occurrence in the first and second trains corresponding to the slope of the path, electrical circuitry for determining the total number of pulses required in each train to traverse the path, and first and second means for receiving the first and second pulse trains, respectively, and for moving the first and second members relative to each other with respect to the first and second axes at rates corresponding to the rates of pulse occurrence in the first and second trains, respectively, and through distances corresponding to the number of pulses in the first and second trains, respectively.

44. A system operative to receive coded numerical data and to control the movement of a first member relative to a second member in accordance with such data with respect to a plurality of noncoincident axes simultaneously, including, circuitry for establishing electrical representations of a plurality of numbers included in said data, a controller operative to receive the electrical representations and to produce a corresponding plurality of pulse trains, the rates of pulse occurrence in the separate trains bearing the same ratio to one another as do their corresponding numbers, and a plurality of devices, each being capable of moving the first member relative to the second member with respect to a particular one of said axes and each being operative upon receipt of its corresponding pulse train to cause movement at a rate proportional to the rate of pulse occurrence in such train.

45. A system for controlling the movement of a first member relative to a second member with respect to a plurality of reference paths simultaneously in accordance with successive blocks of numerical data, each block including a plurality of first numbers and a second number, said system including electrical circuitry for establishing representations of the numerical data in each block, a first unit for receiving representations of the plurality of first numbers and for producing a corresponding plurality of pulse trains, each pulse train containing a number of pulses which is a function of its corresponding first number, the rates of pulse production in the separate trains bearing the same ratio to one another as do their corresponding first numbers, electrical circuitry for controlling the rate of pulse production in said trains in accordance with the representation of the second number, and a plurality of devices, each being capable of moving the first member relative to the second member with respect to a particular one of said reference paths and each being operative upon receipt of its corresponding pulse train to move the first member relative to the second member through a distance proportional to the number of pulses in such train at a rate proportional to the rate of pulse occurrence in such train.

46. A system for controlling the movement of a first member relative to a second member with respect to first and second noncoincident axes simultaneously in accordance with numerical data in recorded form, said numerical data including first, second and third members, said system including circuitry for establishing electrical representations for the first, second and third numbers, and means for receiving the electrical representations and for moving the first member relative to the second member with respect to the first and second axes a distance corresponding to the first and second numbers, respectively, and at rates along the first and second axes which are a function of the third number and bear the same ratio to each other as do the first and second numbers.

47. A system for controlling the movement of a first member relative to a second member with respect to first and second noncoincident axes simultaneously in accordance with numerical data in recorded form, said numerical data including first, second and third numbers, said system including, circuitry for receiving the first, second and third numbers and for producing first and second electrical signals corresponding to the first and second numbers, respectively, each signal having one property which is a function of its corresponding number and a second property which is a function of the third number and bears the same ratio to the second property of the other signal as do their corresponding numbers, and first and second means for receiving the first and second signals, respectively, and for moving the first and second members relative to each other with respect to the first and second axes in accordance with the first and second signals.

48. A system for controlling the movement of a first member relative to a second member through a path with respect to first and second noncoincident axes simultaneously in accordance with numerical data in recorded form, said numerical data including first, second and third numbers, said system including circuitry for establishing first, second and third electrical representations for the first, second and third numbers, respectively, means for receiving the first, second and third electrical representations and for utilizing them to produce first and second trains of pulses, respectively, the rate of pulse occurrence in the first and second trains being a function of the third electrical representation and the ratio between the rates of pulse occurrence in the first and second trains corresponding to the slope of the path, and first and second means for receiving the first and second pulse trains, respectively, and for moving the first and second members relative to each other with respect to the first and second axes at rates corresponding to the rates of pulse occurrence in the first and second trains, respectively.

49. In a system for controlling the movement of a first member relative to a second member with respect to first and second noncoincident axes simultaneously in accordance with numerical data in recorded form, said numerical data including, first and second numbers; the combination of, means for receiving the first and second numbers and for producing first and second electrical signals corresponding to the first and second numbers, respectively, each of said electrical signals having a first property which is determined by its corresponding number and a second property which bears the same ratio to the second property of the other signal as do their corresponding numbers, and means to utilize said first and second electrical signals.

50. In a system for controlling the movement of a first member relative to a second member through a path with respect to first and second noncoincident axes simultaneously in accordance with numerical data in recorded form, said numerical data including, first and second numbers; the combination of, means for establishing first and second electrical representations for the first and second numbers, respectively, means for receiving said first and second electrical representations and for utilizing them to produce first and second trains of electrical pulses, the ratio between the rates of pulse occurrence in the first and second trains corresponding to the slope of the path, and means to utilize said first and second trains of electrical pulses.

51. In a system for controlling the movement of a first member relative to a second member with respect to first and second noncoincident axes simultaneously in accordance with numerical data in recorded form, said numerical data including, first and second numbers; the combination of, means for establishing first and second electrical representations for the first and second numbers, respectively, means for receiving said first and second electrical representations and for utilizing them to produce first and second trains of electrical pulses, each pulse train containing a number of electrical pulses which is a function of its corresponding number, the rates of pulse occurrence in said first and second pulse trains bearing the same ratio to one another as do their corresponding numbers, and means to utilize said first and second trains of electrical pulses.

52. In a system for controlling the movement of a first member relative to a second member through a path with respect to first and second noncoincident axes simultaneously in accordance with numerical data in recorded form, said numerical data including first, second and third numbers; the combination of, means for establishing electrical representation for the first, second and third numbers, respectively, means for receiving said first, second and third electrical representations and for utilizing them to produce first and second trains of pulses, the rate of pulse occurrence in said first and second trains being a function of said third electrical representation and the ratio between the rates of pulse occurrence in said first and second pulse trains corresponding to the slope of the path, and means for utilizing said first and second pulse trains.

53. A system for controlling the movement of a member to effectuate a desired operation comprising first means to move said member along a first co-ordinate a predetermined increment responsive to a pulse, second means to move said member along a second co-ordinate a predetermined increment responsive to a pulse, first means to produce a first plurality of pulses, the total number of pulses in said first plurality being representative of the total number of increments of motion along said first co-ordinate to effectuate said desired operation, second means to produce a second plurality of pulses, the total number of pulses in said second plurality being representative of the total number of increments of motion along said second co-ordinate to effectuate said desired operation, and means to simultaneously apply said first and second plurality of pulses to said first and second means to move said member.

54. A system for controlling the movement of a first member relative to a second member with respect to first and second noncoincident axes simultaneously in accordance with numerical data in recorded form, said numerical data including first and second numbers, said system including means for receiving the first and second numbers and for producing first and second electrical signals corresponding to the first and second numbers, respectively, each signal having a first property which is determined by its corresponding number and a second property which bears the same ratio to the second property of the other signal as do their corresponding numbers, first and second means for receiving the first and second signals, respectively, and for moving the first and second members relative to each other with respect to the first and second axes in accordance with the first and second signals, and manually operable control means for producing electrical control signals for both said axes independently of said numerical data and supplying said electrical control signals to said member moving means in place of said first and second electrical signals.

55. A system for controlling the movement of a first member relative to a second member through a path with respect to first and second reference axes, simultaneously in accordance with numerical data in recorded form, said numerical data including first and second numbers, said system including means for establishing first and second electrical representations for the first and second numbers, respectively, means for receiving the first and second electrical representations and for utilizing them to produce first and second trains of pulses, respectively, the ratio between the rates of pulse occurence in the first and second trains corresponding to the slope of the path, first and second means for receiving first and second pulse trains, respectively, and for moving the first and second members relative to each other with respect to the first and second axes at rates corresponding to the rates of pulse occurrence in the first and second trains, respectively, and manually operable control means for producing third and fourth trains of pulses independently of said numerical data and supplying said third and fourth pulse trains to said first and second member moving means in place of said first and second pulse trains, the ratio between the rates of pulse occurrence in said third and fourth trains corresponding to the slope of a desired manually selectable path with respect to said first and second reference axes.

56. A system for controlling the movement of a first member relative to a second member with respect to a plurality of reference paths simultaneously in accordance with numerical data contained on a recording medium including a pair of registers for receiving and storing the numerical data contained on said medium, control circuitry operative to receive the data stored in the registers and to generate a plurality of separate trains of pulses in accordance with the data, one of said registers being operative to receive data from the recording medium while the other register is simultaneously supplying previously received data to the control circuitry, and a plurality of devices for receiving the pulse trains and for moving the first member relative to the second member with respect to the plurality of reference paths in accordance with the data.

57. In a control system utilizing pulses for controlling the extent of movement of a member, means for signifying the number of pulses to be utilized comprising an elongated tape-like medium divided longitudinally into separate instructions for moving the member, each instruction of said medium signifying in binary notation the desired distance for moving the member, means for reading the binary notation of each instruction and developing a plurality of pulses corresponding to the distance the member is instructed to move, and means operable upon completion of said plurality of pulses for initiating the advance of the record medium with respect to said reading means.

58. In a system for controlling with pulse signals the relative incremental motion along separate co-ordinates of a member, comprising an error register to which control pulses are applied to be counted, means to convert the count of said error register to a voltage having a representative amplitude, means to move said member responsive to said representative voltage, motion transducer means to convert increments of said relative motion to error pulses, means to apply said error pulses to said error register to be subtracted from the count of said control pulses, and means for indicating when the count of said error register exceeds a predetermined value.

59. In a system for controlling the extent of movement of a part, means for successively sensing records each setting forth direction and distance instructions for moving the part, means responsive to said record sensing means for developing a group of electrical pulses quantitatively representing the distance instruction on the record, means receptive to pulses for controlling the movement of the part and operable to move the part a distance proportional to the number of pulses received thereby, means for supplying said group of pulses to said pulse receptive means, and means responsive to said record sensing means for causing said pulse receptive means to move the part in a direction corresponding to the direction instruction on the record.

60. In a system for controlling movement of a part, a record medium divided into separate blocks of instruction each signifying in numerical form a desired distance for moving the part and the desired direction of movement thereof, means for converting each distance instruction into a train of electrical pulses spaced in time and representative of the distance signified for moving the part, means receptive to pulses for controlling the movement of the part and operable to move the part a distance proportional to the number of pulses received thereby, means for supplying said pulse train to said pulse receptive means, and means for controlling said pulse receptive means in accordance with the direction instruction corresponding to the converted distance instruction so that the part is moved in the desired direction.

61. In a system for controlling movement of a part, means for feeding instruction data into the system including records each signifying in numerical form a desired distance instruction for moving the part, means for reading each record and converting the distance instruction thereof into a group of electrical pulses which are substantially uniformly spaced apart in time, the number of pulses in said group corresponding to the distance specified in the distance instruction which is read, and means responsive to said group of pulses for moving the part a distance corresponding to the number of pulses in said group and at a rate corresponding to the spacing of pulses in said group.

62. A system for controlling the movement of a first member relative to a second member along a predetermined path in accordance with successive blocks of numerical data, each block including a first number and a second number, said system including electrical circuitry for establishing representation of the numerical data in each block, means for receiving the representation corresponding to the first number and for producing a train of electrical pulses, the number of pulses in said train being a function of the first number, electrical circuitry for controlling the rate of occurrence of pulses in said pulse train in accordance with the representation of the second number, and means receptive to the pulses in said pulse train and operative to move the first member relative to the second member through a distance proportional to the number of pulses in said pulse train at a rate proportional to the rate of pulse occurrence in said train.

63. In a system for simultaneously controlling the movement of a first member relative to a second member with respect to a plurality of reference paths, means for intermittently feeding input data into the system numerically indicating the successive distances to be moved along said reference paths, means for converting the intermittently fed input data into a plurality of substantially continuous series of pulse trains, the number of pulses in each of said trains corresponding to the successive movements of said first member relative to said second member along said reference paths, and means responsive to said series of pulse trains for simultaneously producing substantially continuous movement along said reference paths.

64. In a system utilizing electrical pulses for controlling the movement of a first member relative to a second member with respect to first and second noncoincident axes simultaneously, means for introducing numerical information into the system signifying the desired movement along said axes, said means comprising an elongated tape-like medium divided longitudinally into separate blocks of instructions, said instruction blocks each having a row of binary notation for movement in each axis signifying the number of pulses to be utilized in moving said first member relative to said second member along the respective axes, said rows of each instruction block extending in parallel side-by-side relation and longitudinally of the medium.

65. In a system utilizing electrical pulses for controlling the direction and extent of movement of a first member relative to a second member with respect to first and second noncoincident axes simultaneously, means for introducing numerical information into the system signifying the direction and desired movement along said axes, said means comprising an elongated tape-like medium divided longitudinally into separate blocks of instruction, said instruction blocks each having a row of binary notation for movement in each axis signifying the number of pulses to be utilized in moving said first member relative to said second member along the respective axes, and each of said instruction blocks including a direction instruction in binary notation signifying the direction of movement of said first member relative to said second member along each of said axes.

66. In a system utilizing electrical pulses for controlling the movement of a first member relative to a second member with respect to first and second noncoincident axes simultaneously, means for introducing numerical information into the system signifying the desired movement along said axes, said means comprising an elongated tape-like medium divided longitudinally into separate blocks of instructions, each of said instruction blocks including a first distance instruction in binary notation signifying the number of pulses to be utilized in moving said first member relative to said second member with respect to said first axis, a second distance instruction in binary notation signifying the number of pulses to be utilized in moving said first member relative to said second member with respect to said second axis, and a pulse rate division instruction in binary notation signifying a common pulse rate division factor for both said first and second axes.

67. A system for controlling the movement of a first member relative to a second member with respect to first and second reference paths simultaneously in accordance with successive blocks of numerical data, each block including first and second numbers, said system including circuitry for establishing electrical representations of the numerical data in each block, and means for receiving said electrical representations and for moving the first member relative to the second member with respect to the first and second reference paths through distances corresponding to the first and second numbers, respectively, and at rates with respect to the first and second reference paths bearing generally the same ratio to each other as do the first and second numbers.

68. A system for controlling the movement of a first member relative to a second member with respect to first and second reference paths simultaneously in accordance with successive blocks of numerical data, each block including first, second and third numbers, said system including circuitry for establishing electrical representations for the first, second and third numbers, and means for receiving said electrical representations and for moving the first member relative to the second member with respect to the first and second reference paths under control of the third number through distances corresponding to the first and second numbers, respectively, and at rates with respect to the first and second reference paths bearing generally the same ratio to each other as do the first and second numbers.

69. A system for controlling the simultaneous movement of a first member relative to a second member with respect to first and second reference axes in accordance with successive blocks of numerical data, each numerical block including first and second numbers each directing a distance of movement relative to one of the axes, said system including circuitry for establishing electrical representations of the numerical data in each block, and means for receiving said electrical representations and for moving the first member relative to the second member with respect to the first and second reference axes through the distances directed by the first and second numbers, respectively, and generally along a path displaced from both the first and second reference axes by amounts that are ratio functions of the first and second numbers.

References Cited in the file of this patent

UNITED STATES PATENTS

| | | |
|---|---|---|
| 2,255,739 | Curtis | Sept. 9, 1941 |
| 2,358,746 | Tandler et al. | Sept. 19, 1944 |
| 2,363,208 | Sulzer | Nov. 21, 1944 |
| 2,384,809 | Bullard et al. | Sept. 18, 1945 |
| 2,475,245 | Leaver et al. | July 5, 1949 |
| 2,484,968 | Sponaugle | Oct. 18, 1949 |
| 2,537,427 | Seid et al. | Jan. 9, 1951 |
| 2,537,770 | Livingston et al. | Jan. 9, 1951 |
| 2,628,539 | Neergaard | Feb. 17, 1953 |
| 2,710,934 | Senn | June 14, 1955 |

FOREIGN PATENTS

| | | |
|---|---|---|
| 356,326 | Great Britain | Sept. 10, 1931 |
| 111,789 | Australia | Apr. 27, 1939 |

OTHER REFERENCES

"A Numerically Controlled Milling Machine," report by Servomechanisms Laboratory of Massachusetts Institute of Technology of 1951.